(12) United States Patent
Hancock, Jr. et al.

(10) Patent No.: US 8,093,322 B2
(45) Date of Patent: *Jan. 10, 2012

(54) NON-REACTIVE ADDITIVES FOR FIBER COATINGS

(75) Inventors: Robert Randall Hancock, Jr., Corning, NY (US); David Neal Schissel, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 1693 days.

This patent is subject to a terminal disclaimer.

(21) Appl. No.: 11/261,328

(22) Filed: Oct. 27, 2005

(65) Prior Publication Data

US 2007/0100039 A1   May 3, 2007

(51) Int. Cl.
C08K 5/16 (2006.01)
(52) U.S. Cl. .......... 524/186; 524/196; 524/239
(58) Field of Classification Search .......... 524/186, 524/239, 196
See application file for complete search history.

(56) References Cited

U.S. PATENT DOCUMENTS

| | | | | |
|---|---|---|---|---|
| 4,474,830 | A | 10/1984 | Taylor | 427/54.1 |
| 4,608,409 | A | 8/1986 | Coady et al. | 524/199 |
| 4,609,718 | A | 9/1986 | Bishop et al. | 528/49 |
| 4,752,112 | A | 6/1988 | Mayr | 350/96.23 |
| 4,851,165 | A | 7/1989 | Rennell, Jr. et al. | 264/1.5 |
| 4,962,992 | A | 10/1990 | Chapin et al. | 350/96.23 |
| 5,104,433 | A | 4/1992 | Chapin et al. | 65/3.1 |
| 5,486,378 | A | 1/1996 | Oestreich et al. | 427/163.2 |
| 5,780,580 | A | 7/1998 | Shalaby et al. | 528/354 |
| 6,326,416 | B1 | 12/2001 | Chien et al. | 522/91 |
| 6,531,522 | B1 | 3/2003 | Winningham | 522/96 |
| 6,539,152 | B1 | 3/2003 | Fewkes et al. | 385/114 |
| 6,553,169 | B2 | 4/2003 | Fabian | 385/128 |
| 6,563,996 | B1 | 5/2003 | Winningham | 385/128 |
| 6,602,601 | B2 | 8/2003 | Fewkes et al. | 428/378 |
| 6,628,875 | B2 | 9/2003 | Baker et al. | 385/128 |
| 6,775,451 | B1 | 8/2004 | Botelho et al. | 385/128 |
| 6,849,333 | B2 | 2/2005 | Schissel et al. | 428/392 |
| 6,862,392 | B2 | 3/2005 | Fabian et al. | 385/128 |
| 6,869,981 | B2 | 3/2005 | Fewkes et al. | 522/33 |
| 2003/0149127 | A1 | 8/2003 | Jansen et al. | |
| 2004/0247273 | A1 | 12/2004 | Fabian et al. | |
| 2005/0158001 | A1 | 7/2005 | Fabian et al. | |
| 2005/0209360 | A1* | 9/2005 | Graichen et al. | 522/178 |

FOREIGN PATENT DOCUMENTS

WO      03011938 A1   2/2003

OTHER PUBLICATIONS

K.J. Calzia et al, "Evaluation of a Molecular Based Yield Model for Glassy Networks", Antec 2004, pp. 2258-2266.
T. Glauser et al, "Toughening of electron-beam cured acrylate resins", Macromol. Mater. Eng. 2000, 280/281, 20-25.
A.J. Lesser et al, "Molecular Parameters Governing the Yield Response of Epoxy-Based Glassy Networks", Journal of Polymer Science, Part B: Polymer Physics, vol. 42, 2050-2056 (2004).
J.A. McConnell et al, "Structure—Performance Relationships of Urethane Acrylates", 1990 American Chemical Society, Chapter 20, pp. 272-283.
R.A. Pearson et al, "Toughening mechanisms in thermoplastic-modified epoxies: 1. Modification using poly(phenylene oxide)", Polymer, 1993, vol. 34, No. 17, pp. 3658-3670.
US 5,578,698, 11/1996, Hagstrom et al. (withdrawn)

* cited by examiner

*Primary Examiner* — Edward Cain
(74) *Attorney, Agent, or Firm* — Robert L. Carlson (57) ABSTRACT

The present invention relates to a curable composition having an oligomer, at least one monomer, and an amount of a substantially non-reactive oligomeric additive. The substantially non-reactive oligomeric additive is present in an amount effective to yield a cured product having a fracture toughness value that is higher than the fracture toughness value of a cured product of an otherwise identical composition lacking the non-reactive oligomeric additive. The present invention also relates to coated optical fibers, optical ribbons or bundles, and telecommunication systems having the curable composition.

16 Claims, 2 Drawing Sheets

NON-REACTIVE ADDITIVES FOR FIBER COATINGS

FIELD OF THE INVENTION

The present invention relates generally to substantially non-reactive oligomeric additives that can be used as components of curable compositions for preparing optical fiber coatings, as well as the resulting coated optical fibers.

BACKGROUND OF THE INVENTION

Optical fiber has acquired an increasingly important role in the field of telecommunications, frequently replacing existing copper wires. This trend has had a significant impact in all areas of telecommunications, greatly increasing the amount of data that is transmitted. Further increase in the use of optical fiber is foreseen, especially in metro and fiber-to-the-home applications, as local fiber networks are pushed to deliver an ever-increasing volume of audio, video, and data signals to residential and commercial customers. In addition, use of fiber in home and commercial premise networks for internal data, audio, and video communications has begun, and is expected to increase.

Optical fiber is typically made of glass, and usually has a polymeric primary coating and a polymeric secondary coating. The primary coating (also known as an inner primary coating), is typically applied directly to the glass fiber and, when cured, forms a soft, elastic, compliant material encapsulating the glass fiber. The primary coating serves as a buffer to cushion and protect the glass fiber during bending, cabling, or spooling. The secondary coating (also known as an outer primary coating) is applied over the primary coating, and functions as a tough, protective, outer layer that prevents damage to the glass fiber during processing, handling, and use.

Secondary coatings conventionally used in optical fibers are typically crosslinked polymers formed by curing a mixture of an oligomer (e.g. a urethane (meth)acrylate) and at least one monomer (e.g. a (meth)acrylate monomer). Generally, increasing the modulus of a urethane/acrylate oligomer based on crosslinked coating results in an accompanying increase in tensile strength and a decrease in elongation at break (McConnell et al., *ACS Symp. Ser.* 417:272-283 (1990)). This generally increases the brittleness of these materials, resulting in coatings considered to have poor toughness. Rigid or multi-functional oligomeric coating additives that could increase modulus, while still maintaining high values of both tensile strength and elongation at break, would be advantageous.

Extensive literature exists on the toughening of polymeric materials (*Polymer Toughening*, Arends, ed., Marcel Dekker (1996) and *Thermosetting Polymers*, Pascault et al., eds., Marcel Dekker (2002)). Many of the toughening concepts applied to thermoplastics have also been applied to crosslinked materials. Most of this work has been done on thermoset materials, particularly epoxy coatings (see Calzia et al., *Antec Proceedings* 2258-2268 (2004) and references cited therein). A number of specific approaches have been taken to modify crosslinked epoxy networks, including: (i) the uniform dispersion of both reactive and non-reactive, soft, rubber-like materials throughout the coating; (ii) the dispersion of hard, reinforcing materials (such as silica, carbon black, clays, and carbon fibers) throughout the coating; and (iii) the dispersion of high molecular weight polymeric additives. Most of these toughening agents are believed to uniformly phase separated throughout the material; they function by absorbing and dissipating external energy to mitigate crack initiation or internal energy and to slow propagation of growing cracks in the crosslinked networks. In addition, epoxy coatings have been prepared from epoxide and amine components containing chemical structures that are tied into the network structure as a means to dissipate energy (via bond shifts or rotations) and provide toughening (see Lesser et al., *J. Poly. Sci.: Part B: Polymer Physics* 42:2050-2056 (2004) and references cited therein). In general, it is much more difficult to find examples of similar approaches to toughening in ultra-violet ("UV") curable acrylic coatings. This may be due to the very fast curing process in the acrylic coatings compared to the epoxies, which may preclude the development of the phase separated network structural features needed for some of the above cited mechanisms to operate efficiently.

Multi-functional urethane/acrylate oligomers containing a very rigid, non-alkoxylated bisphenol A diol in their "arms" have previously been described (U.S. Pat. No. 6,862,392 to Fabian et al.). While all of these materials were found to improve the toughness of secondary fiber coatings, they were all capped with a reactive hydroxy acrylate group that ensured that the additive became chemically bonded to the polymer coating network during photocuring and also was believed to ensure that the additives were uniformly dispersed throughout the coatings. These additives had the desired effect of toughening the resulting coatings. However, these additives-due to their reactivity-rendered the coating compositions less stable to storage and, surprisingly, susceptible to premature gelation that could result in coating defects during manufacture.

Examples of other multi-functional reactive oligomeric materials with structures similar to those previously reported are described in U.S. Pat. No. 5,578,693 to Hagstrom et al., but these materials generally contain higher molecular weight flexible polyols to reduce the oligomer viscosity and to increase its utility in coatings. There is no indication that these oligomers provide enhanced coating toughness despite also being chemically bound into the coating network.

The present invention is directed to curable compositions for secondary optical fiber coatings that overcome these and other limitations in the art.

SUMMARY OF THE INVENTION

A first aspect of the present invention relates to a curable composition having an oligomer, at least one monomer, and an amount of a substantially non-reactive oligomeric additive. The substantially non-reactive oligomeric additive is present in an amount effective to yield a cured product having a fracture toughness value that is higher than the fracture toughness value of a cured product of an otherwise identical composition lacking the non-reactive oligomeric additive.

A second aspect of the present invention relates to a coated optical fiber having an optical fiber, a primary coating surrounding the optical fiber, and a secondary coating surrounding the primary coating. The secondary coating is the cured product of the curable composition in accordance with the first aspect of the present invention.

A third aspect of the present invention relates to an optical fiber ribbon or bundle having a plurality of substantially aligned, coated optical fibers in accordance with the second aspect of the present invention. A matrix encapsulates the plurality of optical fibers.

A fourth aspect of the present invention relates to an optical fiber ribbon or bundle having a plurality of substantially aligned coated optical fibers and a matrix encapsulating the plurality of coated optical fibers. The matrix is the cured product of the curable composition in accordance with the first aspect of the present invention.

A fifth aspect of the present invention relates to a telecommunications system having an optical fiber ribbon or bundle in accordance with either the second aspect or the fourth aspect of the present invention.

A sixth aspect of the present invention relates to an oligomeric compound having the structure of (I) or an average structure of (II) or (III)

$$CAP_1—RT'—OOC—NH—R_1—NH—COO—RT'—CAP_1 \quad (I)$$

$$R_M—[OOC—NH—R_A—NH—COO—RT'—CAP_1]_n \quad (II)$$

$$CAP_1—RT'—OOC—NH—R_1—NH—[COO—R_2—OOC—NH—R_1—NH]_w—COO—RT'—CAP_1 \quad (III).$$

For each structure or average structure of (I), (II), and (III), respectively, $CAP_1$ is a capping moiety having a non-reactive terminus, RT' is a moiety having a reactive terminus that is capped by $CAP_1$, $R_1$ is a polyisocyanate core moiety substantially free of urethane bonds, $R_A$ is $R_1$ or —$R_1$—(NH—COO—$R_C$—OOC—NH—$R_1$)$_t$— where $R_C$ is a polyol-derived core moiety and t has an average value in the range of 0 to about 4, $R_M$ is a core moiety having an average functionality of n, where n is greater than 2.2, $R_2$ includes either at least one crystallizable polyol-derived moiety or at least one cyclic rigid moiety, and w is greater than zero.

A seventh aspect of the present invention relates to an oligomeric compound having a structure of (IV) or average structure of (V) or (VI)

$$CAP_2—X—OCN—R_1—NCO—X—CAP_2 \quad (IV)$$

$$R_M—[OOC—NH—R_A—NCO—X—CAP_2]_n \quad (V)$$

$$CAP_2—X—OCN—R_1—NH—[COO—R_2—OOC—NH—R_1—NH]_w—CO—X—CAP_2 \quad (VI).$$

For each structure or average structure of (IV), (V), and (VI), respectively, $CAP_2$—X— is a capping moiety having a non-reactive terminus, X is S, O, or N, $R_1$ is a polyisocyanate core moiety substantially free of urethane bonds, $R_A$ is $R_1$ or —$R_1$—(NH—COO—$R_C$—OOC—NH—$R_1$)$_t$—where $R_C$ is a polyol-derived core moiety and t has an average value in the range of 0 to about 4, $R_M$ is a core moiety having an average functionality of n, where n is greater than 2.2, $R_2$ includes either at least one crystallizable polyol-derived moiety or at least one cyclic rigid moiety, and w is greater than zero.

The present invention relates to new, substantially non-reactive urethane/acrylate oligomeric additives used in the preparation of optical fiber coatings. The additives can be used to make coatings for fibers that exhibit enhanced handleability characteristics. This is particularly important for photonic specialty fibers because these types of fibers are handled extensively during device fabrication. The high Young's modulus values exhibited by the inventive coatings can help improve the microbend performance of optical fiber, despite the fact that high modulus materials are often brittle (Pearson et al., *Polymer* 34:3658-70 (1993); Glauser et al., *Macromol. Mat. and Eng.* 280/281:20-25 (2000), each of which is hereby incorporated by reference in its entirety). In addition, the additives of the present invention contain substantially no polymerizable functionality to bind them chemically into the polymer coating network. Quite unexpectedly, the additives of the present invention enhance coating mechanical and toughness properties (by maintaining a sufficiently high Young's modulus while increasing fracture toughness) rather than acting as detrimental plasticizing agents. Moreover, because the additives of the present invention are substantially non-reactive, they do not promote polymerization during storage of curable compositions, and the curable compositions remain processable.

In contrast to other non-reactive organic additives that do not become cross-linked into the coating network during curing, the curable compositions in accordance with the present invention continue to enhance coating mechanical properties and toughness properties, while maintaining the glass transition temperature (i.e., of the base composition). Other non-reactive additives that do not possess the structure of the inventive additives are found to act as plasticizing agents, reducing mechanical properties, toughness, and glass transition temperature.

DETAILED DESCRIPTION OF THE INVENTION

A first aspect of the present invention relates to a curable composition having an oligomer, at least one monomer, and an amount of a substantially non-reactive oligomeric additive. The substantially non-reactive oligomeric additive is present in an amount effective to yield a cured product having a fracture toughness value that is higher than the fracture toughness value of a cured product of an otherwise identical composition lacking the non-reactive oligomeric additive.

In a preferred embodiment of the present invention, the oligomer and monomer of the curable composition are ethylenically unsaturated. Even more preferable, the oligomer and monomers of the curable composition are (meth)acrylate-based. The oligomer may be, for example, a urethane (meth)acrylate oligomer. However, as the skilled artisan will recognize, oligomers and monomers adapted for other curing chemistries, such as epoxy, vinyl ether, and thiol-ene, may be used in accordance with the present invention.

The substantially non-reactive oligomeric additive is preferably selected to provide both high modulus and high fracture toughness to the cured product of the curable composition. In particular, substantially non-reactive oligomeric additives that have rigid polyol-derived subunits, multiple functionality (rendered non-reactive), and/or crystallizable moieties are especially desirable for use in the curable compositions of the present invention.

The substantially non-reactive oligomeric additives of the present invention are prepared by providing a polyfunctional oligomer that includes two or more reactive termini (RT) or isocyanate terminal groups, and then reacting the polyfunctional oligomer with a reactive monofunctional capping moiety ($CAP_1$ or $CAP_2$) whereby the resulting product contains CAP-derivatized termini (designated —RT'—$CAP_1$ or —NCO—X—$CAP_2$ where X is a component of the original capping moiety) that are non-reactive.

Reactive polyfunctional oligomers and the resulting substantially non-reactive oligomeric additives are described herein by their average structure. For example, a reactive polyfunctional oligomer prepared from 1.0 equivalent of HO—R—OH, 2.0 equivalents of OCN—$R_1$—NCO, and 2.0 equivalents of RT-OH has the average structure:

and the resulting substantially non-reactive oligomeric additive has the average structure:

While the reactive polyfunctional oligomer and the substantially non-reactive oligomeric additive are, in reality, a mixture of components (e.g., some with two diol blocks, some with one diol block, and some with no diol blocks), their average structures are a weighted average of the components. For cases in which reactants are combined to form a product without subsequent purification, the average structure may conveniently be defined by the stoichiometry of the reactants used to make it.

Thus, it should be appreciated that the substantially non-reactive oligomeric additives of the present invention preferably have the same general structure of the intermediate reactive polyfunctional oligomers, except that they contain a capping moiety ("$CAP_1$" or "$CAP_2$") that forms a non-reactive capping terminus on the RT moiety or isocyanate terminal group, respectively, of the intermediate oligomer.

The reactive polyfunctional oligomers described herein may be synthesized using methods familiar to the skilled artisan, such as those described in U.S. Pat. No. 6,862,392 to Fabian et al., U.S. Pat. No. 4,608,409 to Coady et al., and U.S. Pat. No. 4,609,718 to Bishop et al., each of which is hereby incorporated by reference in its entirety. Typically, a polyisocyanate is reacted with a polyol to yield an isocyanate-terminated urethane oligomer, which is then reacted with a hydroxy-functional moiety (RT-OH), thiol functional moiety (RT-SH), or secondary amine (RT-NHR) having a reactive terminus (RT), e.g. (meth)acrylate, epoxy, vinyl ether, etc. The skilled artisan may use diamines or polyamines in place of some or all of the diol or polyol to provide an oligomer having urea linking moieties.

As used herein, polyisocyanates have the structure $R_1(NCO)_j$, where $R_1$ is the polyisocyanate core moiety. The polyisocyanate is incorporated into the oligomer structure with the core moiety $R_1$ being linked into the oligomer by urethane (—NH—COO—) or urea (—NH—CO—NH—) bonds. A non-exhaustive list of preferred polyisocyanates for use in forming the reactive polyfunctional oligomer (and eventually the substantially non-reactive oligomeric additives of the present invention) is given in Table 1.

TABLE 1

Suitable Polyisocyanates of Oligomer Compositions

| Chemical Name | $R_1$ | Structure |
|---|---|---|
| 4,4'-methylenebis(cyclohexyl-isocyanate) | H12MDI | |
| toluene diisocyanate | TDI | (mixture of 2,4- and 2,6-) |
| isophorone diisocyanate | IPDI | |
| α,α,α',α'-tetramethyl-1,3-xylylene diisocyanate | TMXDI | |
| tris(6-isocyanatohexyl)-isocyanurate | HDIT | |

In a preferred embodiment, RT is linked into the oligomer structure by a urethane bond. A non-exhaustive list of preferred RT moieties for use in acrylate-based curable compositions of the present invention is given in Table 2.

TABLE 2

Preferred RT Moieties for Use in Acrylate-Based Curable Compositions

| Chemical Name | $R_1$ | Structure |
|---|---|---|
| caprolactone acrylate | CLA | ![structure with q-2] |
| (2-hydroxyethyl) acrylate | HEA | ![HEA structure] |
| pentaerythritol triacrylate | PETA | ![PETA structure] |
| (3-hydroxypropyl) acrylate | HPA | ![HPA structure] |
| (4-hydroxybutyl) acrylate | HBA | ![HBA structure] |
| monoacrylated poly(propylene glycol), $M_n \sim 475$ Daltons | PPGA | ![PPGA structure] |

Because substantially non-reactive oligomeric additives, as noted above, are described by their average structure, it is intended that the average structure has less than 1.0, more preferably less than about 0.5, 0.4, or 0.3, most preferably less than 0.2 or 0.1 RT or isocyanate terminal groups per average structure. That is, few, if any, of the reactive termini normally present on the above-described reactive polyfunctional oligomers are present in the substantially non-reactive oligomeric additives of the present invention. As a result, the substantially non-reactive oligomeric additives are generally not capable of cross-linking with the polymeric coating formed upon curing (although some small portion of the oligomeric mixture may retain such termini and, thus, be capable of cross-linking into the polymer structure). This non-reactive structure of the oligomeric additives presumably allows the oligomeric additives to be mechanically (i.e., not chemically) integrated into the curable product. As a result, the substantially non-reactive oligomeric additives do not behave as plasticizers but, instead, help provide both high modulus and high fracture toughness to the cured product of the curable composition.

The capping compounds possess a single functional group that is capable of reacting with the reactive terminus or the isocyanate terminal group of the reactive polyfunctional oligomers. Depending upon the nature of the terminal group on the oligomer, different functional groups can be employed on the capping compound. For example, terminal isocyanate groups on the oligomer will react with capping compounds that possess a hydroxyl group (i.e., an alcohol); terminal (meth)acrylate groups on the oligomer will react with capping compounds that possess a mercapto group (i.e., a thiol) or a secondary amine; terminal epoxy groups on the oligomer will react with capping compounds that possess a carboxylic acid; and terminal vinyl or vinyl ether groups will react with capping compounds that possess a mercapto group (i.e., a thiol). Persons of ordinary skill in the art can readily select appropriate capping compound functional groups that can react with a terminal functional group of a polyfunctional reactive oligomer.

As noted above, $CAP_1$ can be any monofunctional capping component that is capable of reacting with the (meth)acrylate RT moieties, e.g. those listed in Table 2, to form a non-reactive terminus (—RT-$CAP_1$). In a preferred embodiment, $CAP_1$ is a thiol (preferably a $C_{1-15}$ thiol, more preferably a $C_{3-10}$ thiol) or a secondary amine (preferably a $(C_{1-10})_2$ amine, more preferably a $(C_{3-10})_2$ amine).

According to one embodiment, the reactive polyfunctional oligomer has a diisocyanate-derived core linked to two RT moieties through urethane bonds, and has the structure:

where RT is a moiety having a reactive terminus and $R_1$ is substantially free of urethane bonds. The oligomer according to this embodiment preferably has a number average molecular weight ($M_n$) of less than about 1600 Daltons or, more preferably, this oligomer has a $M_n$ of less than about 1200 Daltons. The substantially non-reactive oligomeric additive for use in the curable composition of the present invention has the structure:

CAP$_1$—RT'—OOC—NH—R$_1$—NH—COO—RT'—CAP$_1$ where CAP$_1$ is a capping moiety having a non-reactive terminus, RT' is the derivative of the RT moiety, and R$_1$ is as defined as above.

Specific examples of the above-described preferred class of oligomeric additives include:

CAP$_1$—CLA-OOC—NH—H12MDI—NH—COO—CLA-CAP$_1$;

CAP$_1$—CLA-OOC—NH—IPDI—NH—COO—CLA-CAP$_1$; and

CAP$_1$—CLA-OOC—NH-TMXDI—NH—COO—CLA-CAP$_1$.

In alternative embodiments, HEA is used in place of CLA as the RT' moiety.

According to another embodiment, the reactive polyfunctional oligomer has a number average molecular weight ($M_n$) of less than about 1600 Daltons, and has a preferred formula of:

[HEA-OOC—NH-TDI—NH—COO—PO2NPG-OOC—NH]$_2$TDI

CLA-OOC—NH—H12MDI—NH—COO—CLA;

CLA-OOC—NH—IPDI—NH—COO—CLA; and

CLA-OOC—NH-TMXDI—NH—COO—CLA, where PO2NPG is a propoxylated (1PO/OH) neopentyl glycol-derived moiety having the average structure:

$(CH_3)_2C[CH_2OCH_2CH(CH_3)—]_2$.

The resulting substantially non-reactive oligomeric additives according to this embodiment have the preferred formulae:

[CAP$_1$—HEA-OOC—NH-TDI—NH—COO—PO2NPG-OOC—NH]$_2$TDI

CAP$_1$—CLA-OOC—NH—H12MDI—NH—COO—CLA-CAP$_1$;

CAP$_1$—CLA-OOC—NH—IPDI—NH—COO—CLA-CAP$_1$; and

CAP$_1$—CLA-OOC—NH-TMXDI—NH—COO—CLA-CAP$_1$, where CAP$_1$ is a capping moiety having a non-reactive terminus and PO2NPG is as defined above.

In an alternative embodiment, the reactive polyfunctional oligomer has an average functionality (i.e., average number of reactive termini) greater than 2.2. Preferably, the oligomer has an average functionality of at least about 3. A preferred class of these oligomers has the average structure:

R$_M$[OOC—NH—R$_A$—NH—COO—RT]$_n$, where R$_M$ is a multifunctional core moiety, n is greater than 2.2, and RT is a moiety having a reactive terminus. Preferably, R$_A$ is an isocyanate-derived core moiety R$_1$ that is substantially free of urethane bonds. Alternatively, R$_A$ has the structure:

—R$_1$—(NH—COO—R$_C$—OOC—NH—R$_1$)$_t$— where R$_C$ is a polyol-derived core moiety and t has an average value in the range of 0 to about 4. The resulting substantially non-reactive oligomeric additive has the average structure:

R$_M$[OOC—NH—R$_A$—NH—COO—RT'—CAP$_1$]$_n$, where CAP$_1$ is a capping moiety having a non-reactive terminus, RT' is the derivative of the RT moiety, and R$_M$, R$_A$, R$_1$, R$_C$, and t are as defined above.

Exemplary substantially non-reactive oligomeric additives of this class have the following general formulas:

GlyPO$_{(725)}$[OOC—NH—H12MDI—NH—COO—HEA-CAP$_1$]$_3$;

GlyPO$_{(725)}$[OOC—NH—H12MDI—NH—COO—CLA-CAP$_1$]$_3$;

GlyPO$_{(725)}$[OOC—NH-TMXDI—NH—COO—CLA-CAP$_1$]$_3$;

GlyPO$_{(725)}$[OOC—NH-TDI—NH—COO—CLA-CAP$_1$]$_3$;

GlyPO$_{(725)}$[OOC—NH-TDI—NH—COO—PETA(CAP$_1$)$_3$]$_3$

PertPO$_{(426)}$[OOC—NH—H12MDI—NH—COO—CLA-CAP$_1$]$_4$;

UMB2005[OOC—NH—H12MDI—NH—COO—HEA—CAP$_1$]$_{2.4}$;

TMPPO[OOC—NH—IPDI—NH—COO—PPG$_{(425)}$-OOC—NH—IPDI—NH—COO—HEA-CAP$_1$]$_3$; and

TMPPO[OOC—NH—IPDI—NH—COO-T$_{(650)}$-OOC—NH—IPDI—NH—COO—HEA-CAP$_1$]$_3$.

where UMB2005 is the residue of a hydroxy-functional (2.4 OH/molecule on average) poly(butyl acrylate) having an $M_n$~2600 Daltons available from Esprix Technologies; PertPO$_{(426)}$ is a propoxylated pentaerythrityl moiety having the average structure:

$C[CH_2(OCHCH_3CH_2)_x—]_4$;

GlyPO$_{(725)}$ is a propoxylated glyceryl moiety having an $M_n$~725 Daltons and the average structure:

$CH_2—(OCH_2CHCH_3)_x—$
$|$
$CH—(OCH_2CHCH_3)_x—$
$|$
$CH_2—(OCH_2CHCH_3)_x—$;

and TMPPO is a propoxylated (1 propoxy/OH) trimethanolpropane moiety having the average structure:

$CH_2—(OCH_2CHCH_3)—$
$|$
$CH_3CH_2—C—CH_2—(OCH_2CHCH_3)—$
$|$
$CH_2—(OCH_2CHCH_3)—$.

The skilled artisan will recognize that other combinations of $R_M$, $R_A$, and RT' can be used in the oligomeric additives of this class.

Another class of polyfunctional oligomers contain a linear oligomer backbone with a multifunctional RT moiety such as PETA. For example, a preferred reactive polyfunctional oligomer having a multifunctional RT moiety is:

PETA-OOC—NH-TDI—NH—COO—PETA.

The resulting substantially non-reactive oligomeric additives have the following general structure:

(CAP$_1$)$_x$PETA-OOC—NH-TDI—NH—COO—PETA (CAP$_1$)$_x$ where CAP$_1$ is a capping moiety and x is up to the number of functionality on the derivatized RT', which in the case of PETA is 3.

According to another embodiment, the reactive polyfunctional oligomer includes a crystallizable polyol-derived block in its structure. As used herein, a crystallizable polyol is one having a melting point of greater than about 0° C. Examples of preferred crystallizable polyols include poly(tetramethylene oxide), available as TERATHANE™ from DuPont, and poly(caprolactone) diol. A preferred class of these oligomers has the average structure:

RT-OOC—NH—R$_1$—NH—[COO—R$_X$—OOC—NH—R$_1$—NH]$_w$—COO—RT where w is greater than zero, RT is a moiety having a reactive terminus, R$_X$ includes at least one crystallizable polyol-derived moiety, w is greater than zero, and R$_1$ is as defined above. The resulting substantially non-reactive oligomeric additive has the average structure:

CAP$_1$—RT'—OOC—NH—R$_1$—NH—[COO—R$_X$—OOC—NH—R$_1$—NH]$_w$—COO—RT'—CAP$_1$ where w, R$_1$, R$_X$, RT', and CAP$_1$ are defined as above.

Examples of average structures of oligomeric additives having an oligomer with a crystallizable polyol include:

CAP$_1$—CLA-OOC—NH—H12MDI—NH—COO-T$_{(1000)}$-OOC—NH—H12MDI—NH—COO—CLA-CAP$_1$;

TMPPO[OOC—NH—IPDI—NH—COO-T$_{(650)}$-OOC—NH—IPDI—NH—COO—HEA-CAP$_1$]$_3$; and

[CAP$_1$—HEA-OOC—NH—H12MDI—NH—COO-EO8BPA-OOC—NH—H12MDI—NH—COO]$_2$ T$_{(1000)}$, where EO8BPA has the average structure:

T$_{(1000)}$ has an M$_n$~1000 Daltons and the average structure: —CH$_2$CH$_2$CH$_2$CH$_2$O)$_u$(CH$_2$CH$_2$CH$_2$CH$_2$—, and T$_{(650)}$ has an M$_n$~650 Daltons with a structure analogous to that of T$_{(1000)}$. As the skilled artisan will appreciate, other combinations of CAP$_1$, RT', R$_1$, and R$_X$ can also be used in the oligomeric additives of this class.

According to another embodiment, the reactive polyfunctional oligomer and the substantially non-reactive oligomeric additive have rigid subunits in their structures. Preferably, the rigid subunits are in the polyol-derived portion of the oligomer. Examples of rigid subunits include cyclic moieties such as:

(BPA)

(CHDM)
and isomers;

and isomers;

; and and isomers.

Yet another preferred class of reactive polyfunctional oligomers has the average structure:

RT-OOC—NH—R$_1$—NH—[COO—R$_L$—OOC—NH—R$_1$—NH]$_w$—COO—RT where w is greater than zero, RT is a moiety having a reactive terminus, R$_L$ includes at least one cyclic rigid moiety, and R$_1$ is defined as above. For example, R$_L$ may include the moiety —(R$_4$O)$_v$—R$_5$—(OR$_4$)$_v$, where R$_5$ is a rigid cyclic subunit, R$_4$ is ethylene, propylene, or butylene, and v ranges from 0 to 7. The resulting substantially non-reactive oligomeric additives of the present invention have the average structure:

CAP$_1$—RT'—OOC—NH—R$_1$—NH—[COO—R$_L$—OOC—NH—R$_1$—NH]$_w$—COO—RT'—CAP$_1$ where CAP$_1$ is a capping moiety having a non-reactive terminus, RT' is the derivative of the RT moiety, and R$_1$, R$_L$, and w are defined as described above.

Exemplary substantially non-reactive oligomeric additives of this embodiment include:

[CAP$_1$—HEA-OOC—NH—H12MDI—NH—COO—PO2BPA-OOC—NH]$_2$H12MDI;

[CAP$_1$—HEA-OOC—NH—H12MDI—NH—COO-EO8BPA-OOC—NH—H12MDI—NH—COO]$_2$ T$_{(1000)}$;

[CAP$_1$—HEA-OOC—NH—H12MDI—NH—COO—BPA-OOC—NH—H12MDI—NH—COO]$_2$ PPG$_{(425)}$;

[CAP$_1$—HEA-OOC—NH-TDI—NH—COO—BPA-OOC—NH-TDI—NH—COO]$_2$PPG$_{(425)}$;

[CAP$_1$—HEA-OOC—NH—IPDI—NH—COO—BPA-OOC—NH]$_2$IPDI;

[CAP$_1$—HEA-OOC—NH-TDI—NH—COO—BPA-OOC—NH]$_2$TDI;

[CAP$_1$—HEA-OOC—NH—H12MDI—NH—COO—BPA-OOC—NH]$_2$H12MDI; [CAP$_1$—HEA-OOC—NH-TDI—NH—COO—CHDM-OOC—NH]$_2$TDI; and

[(CAP$_1$)$_3$PETA-OOC—NH-TDI—NH—COO—PO2BPA-OOC—NH]$_2$TDI, where PO2BPA has the average structure:

T$_{(1000)}$ has an M$_n$~1000 Daltons and the average structure

—(CH$_2$CH$_2$CH$_2$CH$_2$O)$_u$(CH$_2$CH$_2$CH$_2$CH$_2$)—;

and PPG$_{(425)}$ has an Mn~425 Daltons and an average structure —(CHCH$_3$CH$_2$O)$_s$(CHCH$_3$CH$_2$)—. As the skilled artisan will appreciate, other combinations of CAP$_1$, RT', R$_1$, and R$_L$ can be used in the oligomeric additives of the curable composition of the present invention.

According to another embodiment, the reactive polyfunctional oligomer includes both rigid polyol-derived subunits and multiple functionality. A preferred class of these oligomers has the average structure:

R$_M$[OOC—NH—R$_1$—NH—(COO—R$_L$—OOC—NH—R$_1$—NH)$_w$—COO—RT]$_n$, where w is greater than zero, n is greater than 2.2, RT is a moiety having a reactive terminus, and R$_L$ includes at least one cyclic rigid moiety. The resulting substantially non-reactive oligomeric additive has the average structure:

R$_M$[OOC—NH—R$_1$—NH—COO—R$_L$—OOC—NH—R$_1$—NH)$_w$—COO—RT'—CAP$_1$]$_n$, where CAP$_1$ is a capping moiety having a non-reactive terminus, RT' is the derivative of the RT moiety, and R$_M$, R$_L$, R$_1$, w, and n are defined as described above.

Examples of average structures of this class of substantially non-reactive oligomeric additives include:

GlyPO$_{(725)}$[OOC—NH—IPDI—NH—CO—BPA-OOC—NH-PDI—NH—COO—HEA-CAP$_1$]$_3$;

GlyPO$_{(725)}$[OOC—NH—H12MDI—NH—COO—BPA-OOC—NH—H12MDI—NH—COO—HEA -CAP$_1$]$_3$;

GlyPO$_{(725)}$[OOC—NH-TDI—NH—COO—BPA-OOC—NH-TDI—NH—COO—HEA -CAP$_1$]$_3$;

GlyPO$_{(725)}$[OOC—NH-TDI—NH—COO—BPA-OOC—NH-TDI)$_2$—NH—COO—HEA-CAP$_1$]$_3$;

GlyPO$_{(725)}$[OOC—NH-TDI—(NH—COO—CHDM-OOC—NH-TDI—NH—COO—HEA-CAP$_1$]$_3$;

GlyPO$_{(725)}$[OOC—NH-TDI—NH—COO—BPA-OOC—NH-TDI—NH—COO—CLA-CAP$_1$]$_3$;

GlyPO$_{(1500)}$[OOC—NH-TDI—NH—COO—BPA-OOC—NH-TDI—NH—COO—HEA-CAP$_1$]$_3$;

PertPO$_{(426)}$[OOC—NH—IPDI—NH—COO—BPA-OOC—NH—IPDI—NH—COO—HEA-CAP$_1$]$_4$;

PertPO$_{(426)}$[OOC—NH-TDI—NH—COO—BPA-OOC—NH-TDI—NH—COO—HEA-CAP$_1$]$_4$;

PertPO$_{(426)}$[OOC—NH-TDI—(NH—COO—BPA-OOC—NH-TDI)$_2$NH—COO—HEA-CAP$_1$]$_4$;

and

TMPPO[OOC—NH-TDI—NH—COO—BPA-OOC—NH-TDI—NH—COO—HEA-CAP$_1$]$_3$ where GlyPO$_{(1500)}$ is a propoxylated glyceryl moiety having an M$_n$~500 Daltons. As the skilled artisan will appreciate, other combinations of RT', R$_1$, R$_M$, and R$_L$ can be used in the reactive polyfunctional oligomers.

The substantially non-reactive oligomeric additives of the present invention may also contain the capping moiety CAP$_2$, which forms a non-reactive capping terminus on the isocyanate terminal group of a reactive polyfunctional oligomer. A preferred CAP$_2$ capping moiety is derived from an alcohol, thiol, or secondary amine, and has a non-reactive terminus. Exemplary CAP$_2$ containing compounds include the thiols and secondary amines as described above (with respect to CAP$_1$ containing compounds), as well as n-alkyl alcohols. In a preferred embodiment, the alkyl group is a C$_{1-15}$ alkyl or, more preferably, a C$_{3-10}$ alkyl. Preferably, the n-alkyl alcohol is n-octyl alcohol or n-propyl alcohol.

According to one embodiment, the reactive polyfunctional oligomer has a diisocyanate-derived core, and has the structure:

OCN—R$_1$—NCO where R$_1$ is substantially free of urethane bonds. The oligomer according to this embodiment preferably has a number average molecular weight (M$_n$) of less than about 1600 Daltons or, more preferably, this oligomer has a M$_n$ of less than about 1200 Daltons.

The resulting substantially non-reactive polyfunctional oligomer has two CAP$_2$ moieties linked via the terminal isocyanate groups, and has the structure:

CAP$_2$—X—OC—NH—R$_1$—NH—CO—X—CAP$_2$ where CAP$_2$—X— is a capping moiety having a non-reactive terminus, R$_1$ is substantially free of urethane bonds, and X is N, S, or O.

According to another embodiment, the reactive polyfunctional oligomer has a number average molecular weight (M$_n$) of less than about 1600 Daltons, and has a preferred formula of:

[OCN-TDI—NH—COO—PO2NPG-OOC—NH]$_2$TDI

OCN—H12MDI—NCO;

OCN—IPDI—NCO; and

OCN-TMXDI—NCO.

The resulting substantially non-reactive oligomeric additives according to this embodiment have the preferred formulae:

$$[CAP_2\text{—}X\text{—}OC\text{—}NH\text{-}TDI\text{—}NH\text{—}COO\text{—}\\PO2NPG\text{—}OOC\text{—}NH]_2TDI$$

$$CAP_2\text{—}X\text{—}OC\text{—}NH\text{—}H12MDI\text{—}NH\text{—}CO\text{—}X\text{—}\\CAP_2;$$

$$CAP_2\text{—}X\text{—}OC\text{—}NH\text{—}IPDI\text{—}NH\text{—}CO\text{—}X\text{—}\\CAP_2; \text{ and}$$

$$CAP_2\text{—}X\text{—}OC\text{—}NH\text{-}TMXDI\text{—}NH\text{—}CO\text{—}X\text{—}\\CAP_2,$$

where $CAP_2$—X— is a capping moiety having a non-reactive terminus and X is as defined above.

In an alternative embodiment, the reactive polyfunctional oligomer has an average functionality (i.e., average number of isocyanate terminal groups) greater than 2.2. Preferably, the oligomer has an average functionality of at least about 3. A preferred class of these oligomers has the average structure:

$$R_M[OOC\text{—}NH\text{—}R_A\text{—}NCO]_n,$$

where $R_M$ is a multifunctional core moiety, and n is greater than 2.2. Preferably, $R_A$ is an isocyanate-derived core moiety $R_1$ that is substantially free of urethane bonds. Alternatively, $R_A$ has the structure:

$$\text{—}R_1\text{—}(NH\text{—}COO\text{—}R_C\text{—}OOC\text{—}NH\text{—}R_1)_t\text{—}$$

where $R_C$ is a polyol-derived core moiety and t has an average value in the range of 0 to about 4. The resulting substantially non-reactive oligomeric additive has the average structure:

$$R_M[OOC\text{—}NH\text{—}R_A\text{—}NCO\text{—}X\text{—}CAP_2]_n,$$

where $CAP_2$—X— is a capping moiety having a non-reactive terminus and $R_M$, $R_A$, $R_1$, $R_C$, X, t, and n are as defined above.

Exemplary substantially non-reactive oligomeric additives of this class have the following general formulas:

$$GlyPO_{(725)}[OOC\text{—}NH\text{—}H12MDI\text{—}NCO\text{—}X\text{—}\\CAP_2]_3;$$

$$GlyPO_{(725)}[OOC\text{—}NH\text{—}H12MDI\text{—}NCO\text{—}X\text{—}\\CAP_2]_3;$$

$$GlyPO_{(725)}[OOC\text{—}NH\text{-}TMXDI\text{—}NCO\text{—}X\text{—}\\CAP_2]_3;$$

$$GlyPO_{(725)}[OOC\text{—}NH\text{-}TDI\text{—}NCO\text{—}X\text{—}CAP_2]_3;$$

$$GlyPO_{(725)}[OOC\text{—}NH\text{-}TDI\text{—}NCO\text{—}X\text{—}CAP_2]_3$$

$$PertPO_{(426)}[OOC\text{—}NH\text{—}H12MDI\text{—}NCO\text{—}X\text{—}\\CAP_2]_4;$$

$$UMB2005[OOC\text{—}NH\text{—}H12MDI\text{—}NCO\text{—}X\text{—}\\CAP_2]_{2.4};$$

$$TMPPO[OOC\text{—}NH\text{—}IPDI\text{—}NH\text{—}COO\text{—}PPG_{(425)}\text{-}\\OOC\text{—}NH\text{—}IPDI\text{—}NCO\text{—}X\text{—}CAP_2]_3; \text{ and}$$

$$TMPPO[OOC\text{—}NH\text{—}IPDI\text{—}NH\text{—}COO\text{-}T_{(650)}\text{-}\\OOC\text{—}NH\text{—}IPDI\text{—}NCO\text{—}X\text{—}CAP_2]_3.$$

The skilled artisan will recognize that other combinations of $R_M$ and $R_A$ can be used in the oligomeric additives of this class.

According to another embodiment, the reactive polyfunctional oligomer includes a crystallizable polyol-derived block in its structure. As used herein, a crystallizable polyol is one having a melting point of greater than about 0° C. Examples of preferred crystallizable polyols include poly(tetramethylene oxide), available as TERATHANE™ from DuPont, and poly(caprolactone) diol. A preferred class of these oligomers has the average structure:

$$OCN\text{—}R_1\text{—}NH\text{—}[COO\text{—}R_X\text{—}OOC\text{—}NH\text{—}R_1\text{—}\\NH]_w\text{—}CO$$

where w is greater than zero, $R_X$ includes at least one crystallizable polyol-derived moiety, w is greater than zero, and $R_1$ is as defined above. The resulting substantially non-reactive oligomeric additive has the average structure:

$$CAP_2\text{—}X\text{—}OCN\text{—}R_1\text{—}NH\text{—}[COO\text{—}R_X\text{—}OOC\text{—}\\NH\text{—}R_1\text{—}NH]_w\text{—}CO\text{—}X\text{—}CAP_2$$

where w, $R_1$, $R_X$, and $CAP_2$—X— are defined as above.

Examples of average structures of oligomeric additives having an oligomer with a crystallizable polyol include:

$$CAP_2\text{—}X\text{—}OCN\text{—}H12MDI\text{—}NH\text{—}COO\text{-}T_{(1000)}\text{-}\\OOC\text{—}NH\text{—}H12MDI\text{—}NCO\text{—}X\text{—}CAP_2;$$

$$TMPPO[OOC\text{—}NH\text{—}IPDI\text{—}NH\text{—}COO\text{-}T_{(650)}\text{-}\\OOC\text{—}NH\text{—}IPDI\text{—}NCO\text{—}X\text{—}CAP_2]_3; \text{ and}$$

$$[CAP_2\text{—}X\text{—}OCN\text{—}H12MDI\text{—}NH\text{—}COO\text{-}\\EO8BPA\text{—}OOC\text{—}NH\text{—}H12MDI\text{—}NH\text{—}COO]_2\\T_{(1000)}.$$

As the skilled artisan will appreciate, other combinations of $CAP_2$—X, $R_1$, and $R_X$ can also be used in the oligomeric additives of this class.

Yet another preferred class of reactive polyfunctional oligomers has the average structure:

$$OCN\text{—}R_1\text{—}NH\text{—}[COO\text{—}R_L\text{—}OOC\text{—}NH\text{—}R_1\text{—}\\NH]_w\text{—}CO$$

where w is greater than zero, $R_L$ includes at least one cyclic rigid moiety, and $R_1$ is defined as above. For example, $R_L$ may include the moiety —$(R_4O)_v$—$R_5OR_4)_v$, where $R_5$ is a rigid cyclic subunit, $R_4$ is ethylene, propylene, or butylene, and v ranges from 0 to 7. The resulting substantially non-reactive oligomeric additives of the present invention have the average structure:

$$CAP_2\text{—}X\text{—}OCN\text{—}R_1\text{—}NH\text{—}[COO\text{—}R_L\text{—}OOC\text{—}\\NH\text{—}R_1\text{—}NH]_w\text{—}CO\text{—}X\text{—}CAP_2$$

where $CAP_2$—X— is a capping moiety having a non-reactive terminus and $R_1$, $R_L$, X, and w are defined as described above.

Exemplary substantially non-reactive oligomeric additives of this embodiment include:

$$[CAP_2\text{—}X\text{—}OCN\text{—}H12MDI\text{—}NH\text{—}COO\text{—}\\PO2BPA\text{—}OOC\text{—}NH]_2H12MDI;$$

$$[CAP_2\text{—}X\text{—}OCN\text{—}H12MDI\text{—}NH\text{—}COO\text{-}\\EO8BPA\text{—}OOC\text{—}NH\text{—}H12MDI\text{—}NH\text{—}COO]_2\\T_{(1000)};$$

$$[CAP_2\text{—}X\text{—}OCN\text{—}H12MDI\text{—}NH\text{—}COO\text{—}BPA\text{-}\\OOC\text{—}NH\text{—}H12MDI\text{—}NH\text{—}COO]_2PPG_{(425)};$$

$$[CAP_2\text{—}X\text{—}OCN\text{-}TDI\text{—}NH\text{—}COO\text{—}BPA\text{-}OOC\text{—}\\NH\text{-}TDI\text{—}NH\text{—}COO]_2PPG_{(425)};$$

$$[CAP_2\text{—}X\text{—}OCN\text{—}IPDI\text{—}NH\text{—}COO\text{—}BPA\text{-}\\OOC\text{—}NH]_2IPDI;$$

$$[CAP_2\text{—}X\text{—}OCN\text{-}TDI\text{—}NH\text{—}COO\text{—}BPA\text{-}OOC\text{—}\\NH]_2TDI;$$

$$[CAP_2\text{—}X\text{—}OCN\text{—}H12MDI\text{—}NH\text{—}COO\text{—}BPA\text{-}\\OOC\text{—}NH]_2H12MDI;$$

[CAP$_2$—X—OCN-TDI—NH—COO—CHDM-OOC—NH]$_2$TDI; and

[CAP$_2$—X—OCN-TDI—NH—COO—PO2BPA-OOC—NH]$_2$TDI.

As the skilled artisan will appreciate, other combinations of CAP$_2$—X—, R$_1$, and R$_L$ can be used in the oligomeric additives of the curable composition of the present invention.

According to another embodiment, the reactive polyfunctional oligomer includes both rigid polyol-derived subunits and multiple functionality. A preferred class of these oligomers has the average structure:

R$_M$[OOC—NH—R$_1$—NH—(COO—R$_L$—OOC—NH—R$_1$—NH)$_w$—CO]$_n$, where w is greater than zero, n is greater than 2.2 and R$_L$ includes at least one cyclic rigid moiety. The resulting substantially non-reactive oligomeric additive has the average structure:

R$_M$[OOC—NH—R$_1$—NH—(COO—R$_L$—OOC—NH—R$_1$—NH)$_w$—CO—X—CAP$_2$]$_n$, where CAP$_2$—X— is a capping moiety having a non-reactive terminus and R$_M$, R$_L$, R$_1$, w, and n are defined as described above.

Examples of average structures of this class of substantially non-reactive oligomeric additives include:

GlyPO$_{(725)}$[OOC—NH—IPDI—NH—COO—BPA-OOC—NH—IPDI—NCO—X—CAP$_2$]$_3$;

GlyPO$_{(725)}$[OOC—NH—H12MDI—NH—COO—BPA-OOC—NH—H12MDI—NCO—X—CAP$_2$]$_3$; GlyPO$_{(725)}$[OOC—NH-TDI—NH—COO—BPA-OOC—NH-TDI—NCO—X—CAP$_2$]$_3$;

GlyPO$_{(725)}$[OOC—NH-TDI—(NH—COO—BPA-OOC—NH-TDI)$_2$—NCO—X—CAP$_2$]$_3$;

GlyPO$_{(725)}$[OOC—NH-TDI—NH—COO—CHDM-OOC—NH-TDI—NCO—X—CAP$_2$]$_3$;

GlyPO$_{(725)}$[OOC—NH-TDI—NH—COO—BPA-OOC—NH-TDI—NCO—X—CAP$_2$]$_3$;

GlyPO$_{(1500)}$[OOC—NH-TDI—NH—COO—BPA-OOC—NH-TDI—NCO—X—CAP$_2$]$_3$;

PertPO$_{(426)}$[OOC—NH—IPDI—NH—COO—BPA-OOC—NH—IPDI—NCO—X—CAP$_2$]$_4$;

PertPO$_{(426)}$[OOC—NH-TDI—NH—COO—BPA-OOC—NH-TDI—NCO—X—CAP$_2$]$_4$;

PertPO$_{(426)}$[OOC—NH-TDI—(NH—COO—BPA-OOC—NH-TDI)$_2$—NCO—X—CAP$_2$]$_4$; and

TMPPO[OOC—NH-TDI—NH—COO—BPA-OOC—NH-TDI—NCO—X—CAP$_2$]$_3$.

As the skilled artisan will appreciate, other combinations of R$_1$, R$_M$, and R$_L$ can be used in the reactive polyfunctional oligomers.

The amount of substantially non-reactive oligomeric additive present in the curable composition of the present invention is an amount effective to yield a cured product having a fracture toughness value that is higher than the fracture toughness value of a cured product of an otherwise identical composition lacking the non-reactive oligomeric additive. Preferably, the substantially non-reactive oligomeric additive is present in an amount up to about 20% of the curable composition or, more preferably, an amount up to about 15% of the curable composition or, even more preferably, an amount up to about 10% of the curable composition. Most preferably, the substantially non-reactive oligomeric additive is present in an amount of about 1% to about 10% of the curable composition.

Other conventional oligomers can also be used in the curable compositions of the present invention. For example, the oligomer may be the product of the reaction of a dihydric polyether, polyester, polycarbonate, or polyol with an aliphatic or aromatic diisocyanate, modified with a reactive terminus. When it is desirable to provide increased moisture resistance, oligomers based on nonpolar diols may be used including, but not limited to, saturated aliphatic diols. Examples of commercially available oligomers suitable for use in the curable compositions of the present invention include, without limitation, BR301 and KWS4131 from Bomar Specialty Co.; RCC12-892 and RCC13-572, from Cognis Corp; PHOTOMER 6010, from Cognis Corp; and EBECRYL 8800, 4883, 8804, 8807, 8402, and 284, from UCB Radcure.

The curable compositions of the present invention also include one or more monomers that will, upon cure, become linked into the polymeric coating. In general, individual monomers capable of greater than about 80% conversion are more desirable than those having lower conversion rates. The degree to which monomers having low conversion rates can be introduced into the curable composition depends upon the particular requirements of the desired cured polymeric material. Typically, higher conversion rates will yield stronger cured products.

Preferred polyfunctional ethylenically unsaturated monomers for use in the curable compositions of the present invention include, without limitation, alkoxylated bisphenol A diacrylates such as ethoxylated bisphenol A diacrylate with ethoxylation being 2 or greater, preferably ranging from 2 to about 30, and propoxylated bisphenol A diacrylate with propoxylation being 2 or greater, preferably ranging from 2 to about 30 (e.g., PHOTOMER 4025 and PHOTOMER 4028, available from Cognis Corp. (Ambler, Pa.)); methylolpropane polyacrylates with and without alkoxylation, such as ethoxylated trimethylolpropane triacrylate with ethoxylation being 3 or greater, preferably ranging from 3 to about 30 (e.g., PHOTOMER 4149, Cognis Corp., and SR499, Sartomer Company, Inc.), propoxylated trimethylolpropane triacrylate with propoxylation being 3 or greater, preferably ranging from 3 to about 30 (e.g., PHOTOMER 4072, Cognis Corp.), and ditrimethylolpropane tetraacrylate (e.g., PHOTOMER 4355, Cognis Corp.); alkoxylated glyceryl triacrylates such as propoxylated glyceryl triacrylate with propoxylation being 3 or greater (e.g., PHOTOMER 4096, Cognis Corp.); erythritol polyacrylates with and without alkoxylation, such as pentaerythritol tetraacrylate (e.g., SR295, available from Sartomer Company, Inc. (Westchester, Pa.)), ethoxylated pentaerythritol tetraacrylate (e.g., SR494, Sartomer Company, Inc.), and dipentaerythritol pentaacrylate (e.g., PHOTOMER 4399, Cognis Corp., and SR399, Sartomer Company, Inc.); isocyanurate polyacrylates formed by reacting an appropriate cyanuric acid with an acrylic acid or acryloyl chloride, such as tris(2-hydroxyethyl) isocyanurate triacrylate (e.g., SR368, Sartomer Company, Inc.) and tris(2-hydroxyethyl) isocyanurate diacrylate; alcohol polyacrylates with and without alkoxylation such as cyclohexane dimethanol diacrylate (e.g., CD406, Sartomer Company, Inc.); epoxy acrylates formed by adding acrylate to bisphenol A diglycidylether and the like (e.g., PHOTOMER 3016, Cognis Corp.); and single and multi-ring cyclic aromatic or non-aromatic polyacrylates such as tricyclodecane dimethanol diacrylate, dicyclopentadiene diacrylate and dicyclopentane diacrylate. Bisphenol A-based monomers are especially preferred for use in the curable compositions of the present invention.

It may be desirable to include a polyfunctional thiol monomer in the curable compositions of the present invention. A polyfunctional thiol monomer can participate in the polymerization through free radical thiol-ene reactions, and will provide a polymer network cross-linked with thioether moieties. Desirably, the polyfunctional thiol has a thiol functionality of at least about 3 thiols/molecule. Examples of suitable polyfunctional thiols include pentaerythritol tetrakis(3-mercaptopropionate); trimethylolpropane tris(3-mercaptopropionate); and CAPCURE LOF, available from Cognis. The polyfunctional thiol monomer is desirably present in the curable composition in an amount of between about 2 wt % and about 20 wt %. In certain desirable curable compositions, the polyfunctional thiol monomer is present in an amount of between about 5 wt % and about 15 wt %.

It may also be desirable to use certain amounts of monofunctional ethylenically unsaturated monomers, which can be introduced to influence the degree to which the cured product absorbs water, adheres to other coating materials, or behaves under stress. Exemplary monofunctional ethylenically unsaturated monomers include, without limitation, hydroxyalkyl acrylates such as 2-hydroxyethyl acrylate, 2-hydroxypropyl acrylate, and 2-hydroxybutyl acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxylethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR506, Sartomer Company, Inc.), tetrahydrofurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4)nonylphenol acrylate (e.g., PHOTOMER 4003, Cognis Corp.); acrylamides such as diacetone acrylamide, isobutoxymethyl acrylamide, N,N'-dimethyl-aminopropyl acrylamide, N,N-dimethyl acrylamide, N,N-diethyl acrylamide, and t-octyl acrylamide; vinylic compounds such as N-vinylpyrrolidone and N-vinylcaprolactam; and acid esters such as maleic acid esters and fumaric acid esters.

Most suitable monomers are either commercially available or readily synthesized using reaction schemes known in the art. For example, most of the above-listed monofunctional monomers can be synthesized by reacting an appropriate alcohol or amine with an acrylic acid or acryloyl chloride.

In a preferred embodiment, the total oligomer content of the curable composition is less than about 25% or, more preferably, the total oligomer content is less than about 15%. The total monomer content of the curable composition is preferably greater than about 65% or, more preferably, the monomer content of the curable composition is greater than about 75%. Use of relatively low amounts of oligomer allows the skilled artisan to easily formulate curable compositions having a desirable viscosity. As the oligomer is typically a more expensive component of the composition, minimization of the amount of oligomer allows the skilled artisan to reduce the cost of the curable composition, as well as the cost of articles, such as optical fibers, coated therewith. Secondary coating compositions having low oligomer content are described in more detail in U.S. Pat. No. 6,775,451 to Botelho et al., which is hereby incorporated by reference in its entirety. In a preferred embodiment, the oligomer is present in the curable composition in a concentration of at least about 1 wt %.

The curable composition of the present invention may also include photoinitiators, antioxidants, and other additives familiar to the skilled artisan, which are customarily included in a curable composition used for secondary optical fiber coatings.

The curable compositions of the present invention may also include a polymerization initiator. The initiator is desirably present in an amount effective to initiate polymerization of the curable composition. Desirable curable compositions of the present invention are adapted to be cured by actinic radiation, and include one or more photoinitiators. For most (meth)acrylate-based curable compositions, conventional photoinitiators, such as ketonic and/or phosphine-oxide based initiators, may be used. Generally, the total photoinitiator content of the curable composition is between about 0.1 and about 10.0 weight percent. More desirably, the total photoinitiator content of the curable composition is between about 1.0 and about 7.5 weight percent. Suitable photoinitiators include, without limitation, 1-hydroxycyclohexylphenyl ketone (e.g., IRGACURE 184 available from Ciba Specialty Chemical (Tarrytown, N.Y.)), (2,6-dimethoxybenzoyl)-2,4,4-trimethylpentyl phosphine oxide (e.g., in commercial blends IRGACURE 1800, 1850, and 1700, Ciba Specialty Chemical), 2,2-dimethoxyl-2-phenyl acetophenone (e.g., IRGACURE 651, Ciba Specialty Chemical), bis(2,4,6-trimethylbenzoyl)phenyl phosphine oxide (e.g., IRGACURE 819, Ciba Specialty Chemical), (2,4,6-trimethylbenzoyl) diphenyl phosphine oxide (e.g., in commercial blend DAROCUR 4265, Ciba Specialty Chemical), 2-hydroxy-2-methyl-1-phenylpropane-1-one (e.g., in commercial blend DAROCUR 4265, Ciba Specialty Chemical) and combinations thereof. It may be desirable to use a combination of an α-hydroxy ketone photoinitiator (e.g., IRGACURE 184) with a bis(acyl)phosphine oxide photoinitiator (e.g., IRGACURE 819) to provide both adequate surface cure and adequate cure of the bulk material. Curable compositions for use as secondary coatings in optical fibers may be formulated with a photoinitiator having an absorption spectrum that does not completely overlap the absorption spectrum of the photoinitiator used in the primary coating composition, as is described in U.S. Pat. No. 6,628,875 to Baker et al., which is hereby incorporated by reference in its entirety. Other photoinitiators are continually being developed and used in coating compositions on glass fibers. Any suitable photoinitiator can be introduced into compositions of the present invention.

In addition to the above-described components, the curable compositions of the present invention can optionally include additional additives. Suitable additives include, without limitation, antioxidants, catalysts, lubricants, low molecular weight non-crosslinking resins, adhesion promoters, coupling agents, coloring agents, and stabilizers. Some additives can operate to control the polymerization process, thereby affecting the physical properties (e.g., modulus, glass transition temperature) of the polymerization product formed from the composition. Others can affect the integrity of the polymerization product of the composition (e.g., protect against de-polymerization or oxidative degradation). A desirable antioxidant is thiodiethylene bis(3,5-di-tert-butyl)-4-hydroxyhydrocinnamate, available as IRGANOX 1035 from Ciba Specialty Chemical). A suitable adhesion promoter is an acrylated acid adhesion promoter such as EBECRYL 170, available from UCB Radcure. Titanium and zirconium-based coupling agents and optical brighteners such as those described in U.S. Pat. No. 6,553,169 to Fabian et al. and U.S. Pat. No. 6,602,601 to Fewkes et al., each of which is hereby incorporated by reference in its entirety, may also be used in the curable compositions of the present invention. Optical brighteners such as UVITEX OB, available from Ciba may also be used in the curable compositions of the present invention.

Other suitable materials for use in secondary coating materials, as well as considerations related to selection of these materials, are well known in the art and are described in U.S. Pat. Nos. 4,962,992 and 5,104,433 to Chapin, each of which is hereby incorporated by reference in its entirety. Various additives that enhance one or more properties of the coating can also be present, including the above-mentioned additives incorporated in the compositions of the present invention.

The curable compositions of the present invention may be cured to yield cured polymeric materials having substantially homogeneous morphologies.

Preferably, a cured product in accordance with the curable composition of the present invention is characterized by a fracture toughness value of at least about 1.0, 1.1, 1.2, or 1.3 MPa·m$^{1/2}$. Even more preferably, a cured product in accordance with the curable composition of the present invention is characterized by a fracture toughness value of at least about 1.4 or 1.5 MPa·m$^{1/2}$.

Fracture toughness ($K_{1C}$) is the resistance of a material to unstable, catastrophic crack growth. The fracture toughness of a material relates to the energy required to propagate a crack in the material. Fracture toughness is measured on film samples, and is defined as $$Y\sigma\sqrt{z}$$

where Y is a geometry factor, σ is the tensile strength (at break) of the film sample, and z is half of the notch length. Fracture toughness is measured on films having a center cut notch geometry.

Figure 3:
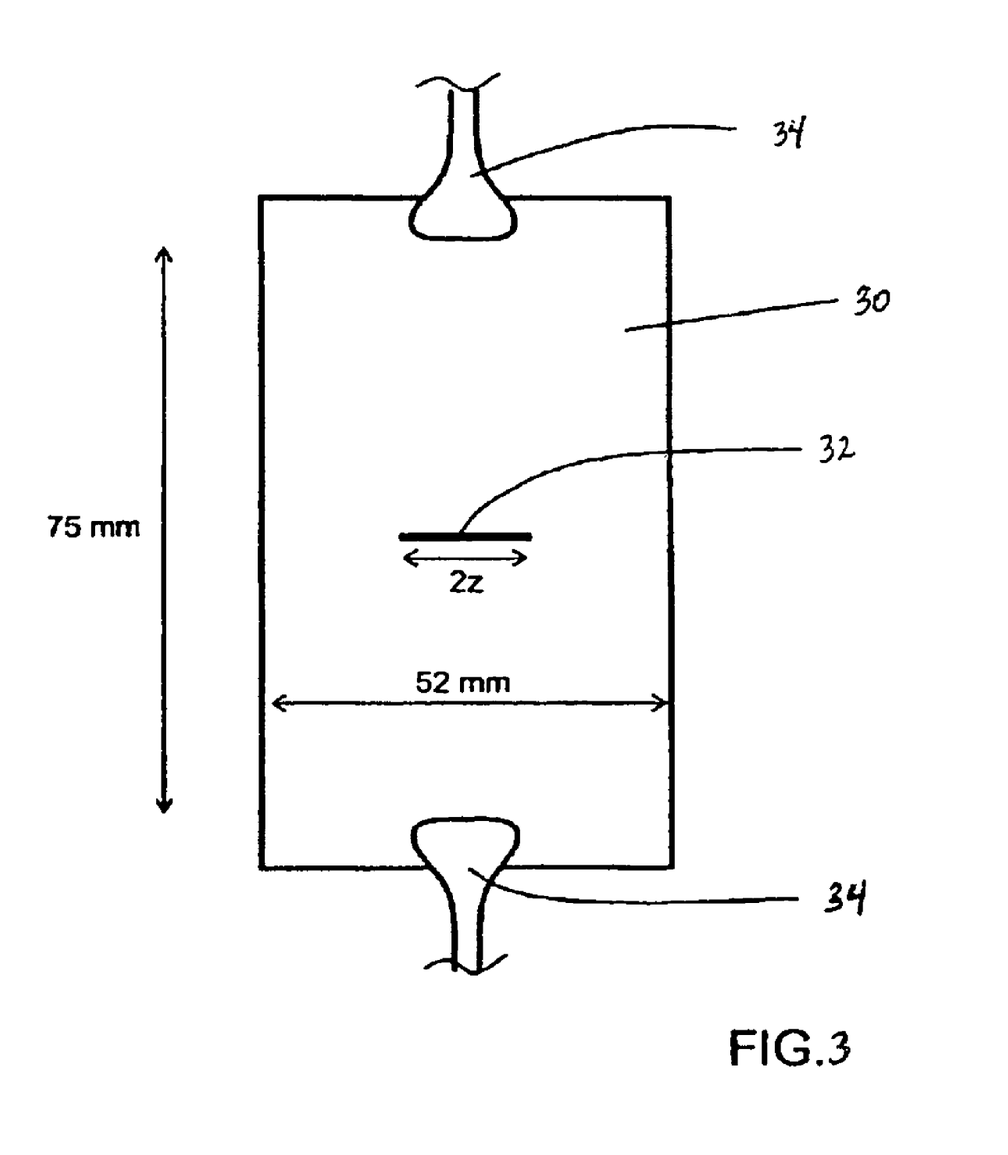
FIG. 3 is a schematic view of a film sample used in the measurement of fracture toughness.

FIG. 3 is a schematic depiction of the sample geometry used in measuring fracture toughness. Film sample 30 has a width of about 52 mm, and is about 0.010" (254 µm) in thickness. Notch 32 is cut in the center of the film using a sharp blade using methods familiar to the skilled artisan. Notches having lengths of 18 mm, 24 mm, and 30 mm are cut in different samples. The tensile strength (at failure) of the sample, σ, is measured using a tensile testing instrument (e.g. a Sinitech MTS Tensile Tester, or an Instron Universal Material Test System). The sample is gripped in jaws 34 of the tensile testing instrument such that the gauge length is 75 mm. The displacement rate is 2.5 cm/min. The tensile strength may be calculated by dividing the applied load at failure by the cross-sectional area of the intact sample. For the samples described above, the tensile strength may be calculated using the equation:

$$\sigma = \frac{\text{Load}}{254\,\mu m(52\,mm - 2z)}.$$

Y is a geometry factor, and is defined as $1.77-0.177(2\lambda)+1.77(2\lambda)^2$, where $\lambda=z$/sample width.

A cured product in accordance with the curable composition of the present invention is characterized by a Young's modulus value that is substantially the same as (or greater than) the Young's modulus value of the cured product of an otherwise identical composition lacking the non-reactive oligomeric additive. As used herein, the Young's modulus of a cured polymeric material is measured using a tensile testing instrument (e.g. a Sinitech MTS Tensile Tester, or an Instron Universal Material Test System) on a sample of a material shaped as a cylindrical rod about 0.0225" (571.5 µm) in diameter, with a gauge length of 5.1 cm, and a test speed of 2.5 cm/min. By "substantially the same," it is meant that the Young's modulus value of a cured product in accordance with the curable composition of the present invention is no more than about 20% higher or lower or, more preferably, no more than about 15% higher or lower or, most preferably, no more than about 10% higher or lower than the Young's modulus value of a cured product of an otherwise identical composition lacking the non-reactive oligomeric additive. The Young's modulus of a cured product in accordance with the present invention is preferably at least about 1200, 1300, or 1400 MPa. Even more preferably, the Young's modulus of the cured product is at least about 1500, 1600, or 1700 MPa. Most preferably, the cured product has a Young' modulus of at least about 1800, 1900, or 2000 MPa.

Yield stress is also an important parameter of a cured product in accordance with the curable composition of the present invention. The value is used to calculate an important material property, the a* parameter. The constant a* is equal to $(1/\pi)(K_{1C}$/yield stress$)^2$, and reflects the defect sensitivity of the secondary coating on fiber. The higher the a* value in microns, the less sensitive a coating is to defect initiation. A cured product in accordance with the curable composition is preferably characterized by a defect sensitivity value greater than about 200 µm. Even more preferably, the defect sensitivity value of a cured product in accordance with the present invention is greater than about 210 or 220 µm.

It is desirable to have a secondary optical fiber coating with a high $K_{1C}$ value and a low yield stress. Cured products in accordance with the curable composition of the present invention generally exhibit this characteristic, having both high fracture toughness ($K_{1C}$) and high a*. In a preferred embodiment, a cured product in accordance with the curable composition of the present invention is characterized by both a fracture toughness value of at least about 1.1 MPa·m$^{1/2}$ and a defect sensitivity value (a*) greater than about 200 µm.

A cured product in accordance with the curable composition of the present invention preferably has a glass transition temperature ($T_g$) that is substantially the same as the glass transition temperature ($T_g$) of the cured product of an otherwise identical composition lacking the non-reactive oligomeric additive of the present invention. In a preferred embodiment, the cured product has a glass transition temperature ($T_g$) that is no more than about 20% higher or lower than the glass transition temperature ($T_g$) of the cured product of an otherwise identical composition lacking the non-reactive oligomeric additive. Glass transition temperature ($T_g$) values of the cured products of the present invention are preferably greater than about 60° C., more preferably in a range of about 60 to about 80° C.

The curable compositions of the present invention are useful as secondary coatings for optical fibers. Thus, another aspect of the present invention relates to a coated optical fiber having an optical fiber, a primary coating surrounding the optical fiber, and a secondary coating surrounding the primary coating. The secondary coating is the cured product of the curable composition in accordance with the first aspect of the present invention.

Figure 1:
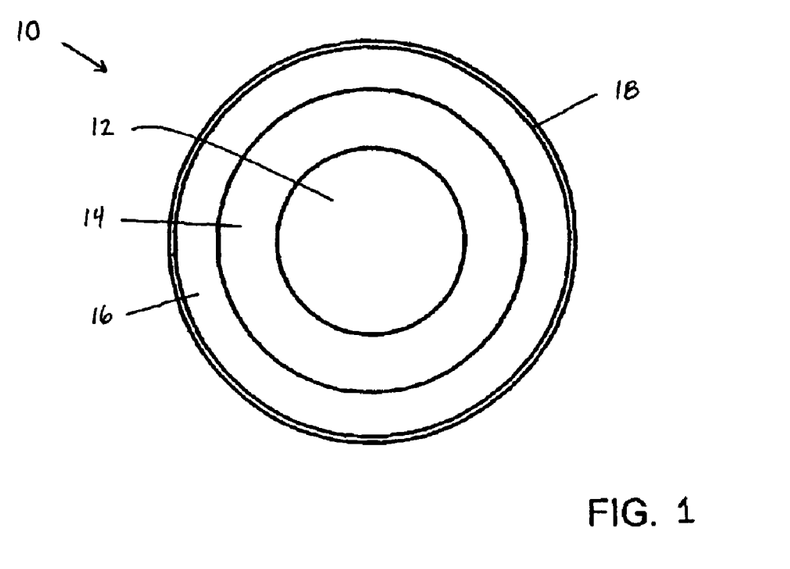
FIG. 1 is a schematic view of an optical fiber, including a marking ink, in accordance with the present invention.

An example of a coated optical fiber in accordance with the present invention is shown in a schematic cross-sectional view in FIG. 1. Coated optical fiber 10 includes glass optical fiber 12 surrounded by primary coating 14 and secondary coating 16. Glass fiber 12 is an uncoated optical fiber including a core and a cladding, as is familiar to the skilled artisan. The uncoated optical fiber may be a single mode fiber, or a multimode fiber. The optical fiber may be adapted for use as a data transmission fiber (e.g. SMF-28®, LEAF®, and MET-ROCOR®, each of which is available from Corning Incorporated of Corning, N.Y.). Alternatively, the optical fiber may perform an amplification, dispersion compensation, or polarization maintenance function. The skilled artisan will appreciate that the coatings described herein are suitable for use with virtually any optical fiber for which protection from the environment is desired.

In coated optical fiber 10, glass fiber 12 is surrounded by a primary coating 14. Primary coating 14 is formed from a soft crosslinked polymer material having a low Young's modulus (e.g. less than about 5 MPa at 25° C.) and a low glass transition temperature (e.g. less than about −10° C.). Primary coating 14 desirably has a higher refractive index than the cladding of the optical fiber in order to allow it to strip errant optical signals away from the optical fiber core. The primary coating should maintain adequate adhesion to the glass fiber during thermal and hydrolytic aging, yet be strippable therefrom for splicing purposes. The primary coating typically has a thickness in the range of 25-40 µm (e.g. about 32.5 µm). Primary coatings are typically applied to the glass fiber as a liquid and cured. Conventional curable compositions used to form primary coatings are formulated using an oligomer (e.g. a polyether urethane acrylate), one or more monomer diluents (e.g. ether-containing acrylates), a photoinitiator, and other desirable additives (e.g. antioxidant). Primary coatings for optical fibers have been well-described in the past, and are familiar to those with skill in the art. Desirable primary coatings are disclosed in U.S. Pat. No. 6,326,416 to Chien et al., U.S. Pat. No. 6,531,522 to Winningham, U.S. Pat. No. 6,539,152 to Fewkes et al., U.S. Pat. No. 6,849,333 to Schissel et al., U.S. Pat. No. 6,563,996 to Winningham, and U.S. Pat. No. 6,869,981 to Fewkes et al., each of which is hereby incorporated by reference in its entirety. Another desirable primary coating is the cured reaction product of a primary coating composition including 52 wt % BR3741 (Bomar Specialties); 25 wt % PHOTOMER 4003 (Cognis); 20 wt % TONE M-100 (Dow Chemical); 1.5 wt % IRGACURE 819 (Ciba); 1.5 wt % IRGACURE 184 (Ciba); 1 pph (3-acryloxypropyl)trimethoxysilane (Gelest); and 0.032 pph pentaerythritol tetrakis(3-mercaptoproprionate) (Aldrich).

In coated optical fiber 10, primary coating 14 is surrounded by secondary coating 16. In FIG. 1, the secondary coating is shown as being applied directly to the primary coating. However, the skilled artisan will recognize that there may be one or more intermediate coating layers deposited between the primary coating and the secondary coating. Secondary coating 16 is formed from a cured polymeric material and typically has a thickness in the range of 20-35 µm (e.g. about 27.5 µm). The secondary coating preferably has sufficient stiffness to protect the optical fiber, is flexible enough to be handled, bent, or spooled, has low tackiness to enable handling and prevent adjacent convolutions on a spool from sticking to one another, is resistant to water and chemicals such as optical fiber cable filling compound, and has adequate adhesion to the coating to which it is applied (e.g. the primary coating).

Optical fibers having secondary coatings derived from the curable composition in accordance with the present invention are made by standard methods. Briefly, this process involves fabricating the glass fiber (using methods familiar to the skilled artisan), applying a primary coating composition to the glass fiber, polymerizing the primary coating composition to form the primary coating material, applying the curable composition described above to the coated glass fiber, and polymerizing the curable composition to form the cured polymeric material as the secondary coating of the optical fiber. Optionally, the secondary coating composition can be applied to the coated fiber before polymerizing the primary coating composition, in which case only a single polymerization step is employed.

The primary and secondary coating compositions are coated on a glass fiber using conventional processes, for example, on a draw tower. It is well known to draw glass fibers from a specially prepared, cylindrical preform which has been locally and symmetrically heated to a temperature, e.g., of about 2000° C. As the preform is heated, such as by feeding the preform into and through a furnace, a glass fiber is drawn from the molten material. One or more coating compositions are applied to the glass fiber after it has been drawn from the preform, preferably immediately after cooling. The coating compositions are then cured to produce the coated optical fiber. The method of curing can be thermal, chemical, or radiation induced, such as by exposing the applied (and un-cured) coating composition on the glass fiber to ultraviolet light, actinic radiation, microwave radiation, or electron beam, depending upon the nature of the coating composition(s) and polymerization initiator being employed. It is frequently advantageous to apply both a primary coating composition and any secondary coating compositions in sequence following the draw process. One method of applying dual layers of coating compositions to a moving glass fiber is disclosed in U.S. Pat. No. 4,474,830 to Taylor, which is hereby incorporated by reference in its entirety. Another method for applying dual layers of coating compositions onto a glass fiber is disclosed in U.S. Pat. No. 4,581,165 to Rannell et al., which is hereby incorporated by reference in its entirety. Of course, the primary coating composition can be applied and cured to form the primary coating material, then a curable composition in accordance with the present invention can be applied and cured to form the cured polymeric material of the secondary coating.

A further aspect of the present invention relates to an optical fiber ribbon or bundle having a plurality of substantially aligned, coated optical fibers in accordance with the second aspect of the present invention. A matrix encapsulates the plurality of optical fibers.

Figure 2:
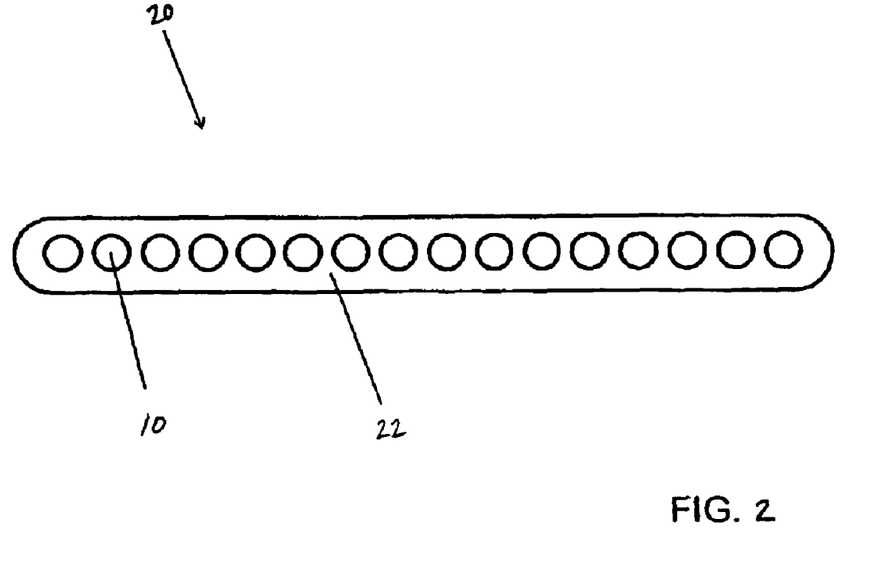
FIG. 2 is a schematic view of an optical fiber ribbon in accordance with the present invention.

One embodiment of a ribbon of the present invention is illustrated in FIG. 2. As shown therein, fiber optic ribbon 20 of the present invention includes a plurality of single or multi-layered optical fibers 10 substantially aligned relative to one another in a substantially planar relationship and encapsulated by matrix 22. The skilled artisan will appreciate that optical fibers 10 may include a dual-layer coating system (for example, the primary and secondary coatings described above), and may be colored with a marking ink. It is desirable that optical fibers 10 are not displaced from a common plane by a distance of more than about one-half the diameter thereof. By substantially aligned, it is intended that optical fibers 10 are generally parallel with other optical fibers along the length of fiber optic ribbon 20. In FIG. 2, fiber optic ribbon 20 contains sixteen (16) optical fibers 10. However, it should be apparent to those skilled in the art that any number of optical fibers 10 (e.g., two or more) may be employed to form fiber optic ribbon 20 disposed for a particular use.

The optical fibers in fiber optic ribbons or bundles of the present invention may be encapsulated by matrix 22 in any known configuration (e.g., edge-bonded ribbon, thin-encapsulated ribbon, thick-encapsulated ribbon, or multi-layer ribbon) by conventional methods of making fiber optic ribbons.

The fiber optic ribbon may also be prepared by conventional methods using the curable composition of the present invention to form the matrix material. For example, upon alignment of a plurality of substantially planar optical fibers, the composition of the present invention can be applied and cured according to the methods of preparing optical fiber ribbons as described in U.S. Pat. No. 4,752,112 to Mayr and U.S. Pat. No. 5,486,378 to Oestreich et al., each of which is hereby incorporated by reference in its entirety.

The curable compositions of the present invention may also be advantageously used in the formulation of marking inks for optical fibers. As such, a coated optical fiber includes an optical fiber, a coating system encapsulating the optical fiber (such as the coating systems described hereinabove), and a marking ink deposited on the exterior of the coating system. For example, FIG. 1 shows a schematic view of marked optical fiber 10 including glass optical fiber 12, a coating system including primary coating 14 and secondary coating 16, and marking ink 18. Marking ink 18 is the cured product of a curable composition of the present invention disclosed above. A marking ink is typically formed as a thin layer of a colored coating on the outer surface of a secondary coating of an optical fiber. Pigments and/or dyes may be added by the skilled artisan to the curable compositions of the present invention to provide a suitable marking ink. It may be desirable to include a titanate or zirconate coupling agent in the marking ink curable composition, as described in U.S. Pat. No. 6,553,169, to Fabian, which is hereby incorporated by reference in its entirety.

The curable compositions and cured polymeric materials of the present invention have been described above in conjunction with a secondary coating of an optical fiber. However, the skilled artisan will appreciate that the curable compositions and cured polymeric materials described herein may be useful in other coating applications requiring very hard, tough coatings. For example, the coatings of the present invention may be used in recoating a stripped optical fiber, for example, at a splice joint.

Having formed an optical fiber ribbon or fiber bundle in accordance with the present invention, these products are intended to be used in a telecommunication system for transmission of data signals over a network.

EXAMPLES

The examples below are intended to exemplify the practice of the present invention but are by no means intended to limit the scope thereof.

Example 1

Preparation of Urethane/Acrylate Oligomers with Substantially Non-Reactive Oligomeric Additives All formulations contain 1.5 pph Irgacure 819=Bis(2,4,6-trimethylbenzoyl)-phenylphosphineoxide from Ciba, 1.5 pph Irgacure 184=1-Hydroxy-cyclohexyl-phenyl-ketone from Ciba.

Photomer 4028 is ethoxylated (4) BPA diacrylate monomer, which was obtained from Cognis Corporation. Photomer 3016 is epoxy acrylate oligomer obtained from Cognis Corporation. Sylvatac R40 and Sylvatac RE25 are proprietary pentaerythritol based resin ester tackifiers obtained from Arizona Chemical.

$PEryth(PO)_5[IPDI\sim BPA\sim IPDI\sim HEA]_4$    Reactive Oligomer 1

Urethane acrylate oligomer with the structure $PEryth(PO)_5[IPDI\sim BPA\sim IPDI\sim HEA]_4$ was prepared by initially heating a mixture of 78.5 g Photomer 4028, 20.0 g (0.088 mole) bisphenol A (Aldrich), 9.34 g (0.022 mole) propoxylated (5PO/4OH) pentaerythritol (Aldrich, Mn=426) (also designated $PertPO_{(426)}$ above), 10.19 g (0.088 mole) 2-hydroxyethyl acrylate (Aldrich), and 240 mg of MEHQ stabilizer at 75-80° C., under vacuum (1 mm) for 2 h. The vacuum was released and a calcium chloride drying tube was attached to the reaction vessel which was then cooled to less than 20° C., at which point 39.0 g (0.175 mole) of isophorone diisocyanate (Aldrich) was added dropwise, followed by 120 mg of dibutyltin dilaurate. The mixture was heated at 75-80° C. for 2 h to complete the reaction.

$PEryth(PO)_5[IPDI\sim BPA\sim IPDI\sim HEA]_2$
$[IPDI\sim BPA\sim IPDI\sim OA]_2$    Partially Reactive Oligomer 2

Urethane acrylate oligomer with the structure $PEryth(PO)_5[IPDI\sim BPA\sim IPDI\sim HEA]_2[IPDI\sim BPA\sim IPDI\sim OA]_2$ was prepared by initially heating a mixture of 78.5 g Photomer 4028, 20.0 g (0.088 mole) bisphenol A, 9.34 g (0.022 mole) propoxylated (5PO/4OH) pentaerythritol (Aldrich, Mn=426), and 240 mg of MEHQ stabilizer at 75-80° C. under vacuum (1 mm) for 1 h. The vacuum was released and a calcium chloride drying tube was attached to the reaction vessel which was then cooled to less than 20° C., at which point 39.0 g (0.175 mole) of isophorone diisocyanate was added dropwise, followed by 120 mg of dibutyltin dilaurate. The mixture was heated at 75-80° C. for 1.5 h and was then cooled to less than 65° C. when a mixture of 5.11 g (0.044 mole) of 2-hydroxyethyl acrylate and 5.72 g (0.044 mole) of n-octyl alcohol was added over 5 min. The mixture was heated at 75-80° C. for 2 h to complete the reaction.

$PEryth(PO)_5[IPDI\sim BPA\sim IPDI\sim HEA]$
$[IPDI\sim BPA\sim IPDI\sim OA]_3$    Partially Reactive Oligomer 3

Urethane acrylate oligomer with the structure $PEryth(PO)_5[IPDI\sim BPA\sim IPDI\sim HEA][IPDI-BPA\sim IPDI\sim OA]_3$ was prepared by initially heating a mixture of 78.5 g Photomer 4028, 20.0 g (0.088 mole) bisphenol A, 9.34 g (0.022 mole) propoxylated (5PO/4OH) pentaerythritol (Aldrich, Mn=426), and 240 mg of MEHQ stabilizer at 75-80° C. under vacuum (1 mm) for 1 h. The vacuum was released and a calcium chloride drying tube was attached to the reaction vessel which was then cooled to less than 20° C., at which point 39.0 g (0.175 mole) of isophorone diisocyanate was added dropwise, followed by 120 mg of dibutyltin dilaurate. The mixture was heated at 75-80° C. for 1.5 h and was then cooled to less than 65° C. when a mixture of 2.55 g (0.022 mole) of 2-hydroxyethyl acrylate and 8.58 g (0.066 mole) of n-octyl alcohol was added over 5 min. The mixture was heated at 75-80° C. for 2 h to complete the reaction.

$GlyPO_{(725)}[IPDI\sim BPA\sim IPDI\sim BPA\sim IPDI\sim HEA]_3$    Reactive Oligomer 4

Urethane acrylate oligomer with the structure GP725 $[EPDI\sim BPA\sim EPDI\sim BPA\sim IPDI\sim HEA]_3$ was prepared by initially heating a mixture of 81.2 g Photomer 4028, 25.0 g (0.110 mole) bisphenol A, and 130 mg of MEHQ stabilizer at 75-80° C. under vacuum (1 mm) for 2 h. The vacuum was released and the mixture was placed under nitrogen and cooled to less than 20° C. when 36.56 g (0.164 mole) of isophorone diisocyanate was added, followed by 130 mg of dibutyltin dilaurate. The mixture was heated at 75-80° C. for 1.5 h and was then cooled to less than 65° C. when 6.37 g (0.055 mole) of 2-hydroxyethyl acrylate was added over 5 min. The mixture was heated at 75-80° C. for 1.5 h and then cooled again to less than 65° C. followed by addition of 13.25 g (0.018 mole) glycerol propoxylate (Aldrich, Mn=725) over 5 min. The mixture was heated at 75-80° C. for 2 h to complete the reaction.

PEryth(PO)$_5$[IPDI~BPA~IPDI~
OA]$_4$             Substantially Non-reactive Oligomer A Urethane acrylate oligomer with the structure PEryth(PO)$_5$[IPDI~BPA~IPDI~OA]$_4$ was prepared by initially heating a mixture of 78.5 g Photomer 4028, 20.0 g (0.088 mole) bisphenol A, 9.34 g (0.022 mole) propoxylated (5PO/4OH) pentaerythritol (Aldrich, Mn=426), and 240 mg of MEHQ stabilizer at 75-80° C. under vacuum (1 mm) for 1 h. The vacuum was released and a calcium chloride drying tube was attached to the reaction vessel which was then cooled to less than 20° C., at which point 39.0 g (0.175 mole) of isophorone diisocyanate was added dropwise, followed by 120 mg of dibutyltin dilaurate. The mixture was heated at 75-80° C. for 1.5 h and was then cooled to less than 65° C. when 11.44 g (0.088 mole) of n-octyl alcohol was added over 5 min. The mixture was heated at 75-80° C. for 2 h to complete the reaction.

PEryth(PO)$_5$[IPDI~BPA~
IPDI~PA]$_4$             Substantially Non-reactive Oligomer B Urethane acrylate oligomer with the structure PEryth(PO)$_5$[IPDI~BPA~IPDI~PA]$_4$ was prepared by initially heating a mixture of 92.0 g Photomer 4028, 25.0 g (0.110 mole) bisphenol A, 11.68 g (0.027 mole) propoxylated (5PO/4 OH) pentaerythritol (Aldrich, Mn=426), and 140 mg of MEHQ stabilizer at 75-80° C. under vacuum (1 mm) for 1.5 h. The vacuum was released and a calcium chloride drying tube was attached to the reaction vessel which was then cooled to less than 20° C., at which point 48.75 g (0.219 mole) of isophorone diisocyanate was added dropwise, followed by 140 mg of dibutyltin dilaurate. The mixture was heated at 75-80° C. for 1.5 h and was then cooled to less than 65° C. when 6.59 g (0.110 mole) of n-propyl alcohol was added over 5 min. The mixture was heated at 75-80° C. for 2 h to complete the reaction.

GP725[IPDI~BPA~IPDI~
BPA~IPDI~OA]$_3$             Substantially Non-reactive Oligomer C Urethane acrylate oligomer with the structure GP725[EPDI~BPA~IPDI~BPA~IPDI~OA]$_3$ was prepared by initially heating a mixture of 82.0 g Photomer 4028, 25.0 g (0.110 mole) bisphenol A, 13.25 g (0.018 mole) glycerol propoxylate (Aldrich, Mn=725) (also designated GlyPO$_{(725)}$ above) and 130 mg of MEHQ stabilizer at 75-80° C. under vacuum (1 mm) for 1.5 h. The vacuum was released and the mixture was placed under nitrogen and cooled to less than 20° C. when 36.56 g (0.164 mole) of isophorone diisocyanate was added, followed by 130 mg of dibutyltin dilaurate. The mixture was heated at 75-80° C. for 1.5 h and was then cooled to less than 65° C. when 6.37 g (0.055 mole) of n-octyl alcohol was added over 5 min. The mixture was heated at 75-80° C. for 2 h to complete the reaction.

Example 2

Preparation of Secondary Coatings

The above-noted (comparative) reactive oligomers and substantially non-reactive oligomers were used to prepare secondary coating compositions. The formulation of the compositions is set forth in Table 3 below.

TABLE 3

Curable Compositions with Oligomeric Additives and Controls

| Coating | Composition (wt %) | Coating $T_g$ (° C.) |
|---|---|---|
| Functional Comparative 1a | Composition 1 - 20<br>Photomer 3016 - 5<br>Photomer 4028 - 72<br>Irgacure 184 - 1.5<br>Irgacure 819 - 1.5 | $T_g$ = 61.5 |
| Functional Comparative 2 | Composition 2 - 20<br>Photomer 3016 - 5<br>Photomer 4028 - 72<br>Irgacure 184 - 1.5<br>Irgacure 819 - 1.5 | $T_g$ = 57.5 |
| Functional Comparative 3 | Composition 3 - 20<br>Photomer 3016 - 5<br>Photomer 4028 - 72<br>Irgacure 184 - 1.5<br>Irgacure 819 - 1.5 | $T_g$ = 60.3 |
| Test Coating A1 | Composition A - 20<br>Photomer 3016 - 5<br>Photomer 4028 - 72<br>Irgacure 184 - 1.5<br>Irgacure 819 - 1.5 | $T_g$ = 61.5 |
| Plasticizer Comparative 1 | Sylvatac R40 - 10<br>Photomer 3016 - 5<br>Photomer 4028 - 82<br>Irgacure 184 - 1.5<br>Irgacure 819 - 1.5 | $T_g$ = 48.3 |
| Plasticizer Comparative 2 | Sylvatac RE25 - 10<br>Photomer 3016 - 5<br>Photomer 4028 - 82<br>Irgacure 184 - 1.5<br>Irgacure 819 - 1.5 | $T_g$ = 48.6 |
| Plasticizer Comparative 3 | Dioctylphthalate - 10<br>Photomer 3016 - 5<br>Photomer 4028 - 82<br>Irgacure 184 - 1.5<br>Irgacure 819 - 1.5 | $T_g$ = 52.9 |
| Functional Comparative 4 | Composition 4 - 20<br>Photomer 3016 - 5<br>Photomer 4028 - 72<br>Irgacure 184 - 1.5<br>Irgacure 819 - 1.5 | $T_g$ = 63.0 |
| Test Coating C | Composition C - 20<br>Photomer 3016 - 5<br>Photomer 4028 - 72<br>Irgacure 184 - 1.5<br>Irgacure 819 - 1.5 | $T_g$ = 61.6 |
| Test Coating B | Composition B - 20<br>Photomer 3016 - 5<br>Photomer 4028 - 72<br>Irgacure 184 - 1.5<br>Irgacure 819 - 1.5 | $T_g$ = 60.2 |
| Functional Comparative 1b | Composition 1 - 20<br>Photomer 3016 - 5<br>Photomer 4028 - 72<br>Irgacure 184 - 1.5<br>Irgacure 819 - 1.5 | $T_g$ = 64.4 |
| Test Coating A2 | Composition A - 20<br>Photomer 3016 - 5<br>Photomer 4028 - 72<br>Irgacure 184 - 1.5<br>Irgacure 819 - 1.5 | $T_g$ = 61.3 |
| Negative Control 1 | Photomer 4028 - 97<br>Irgacure 1850 - 3 | $T_g$ = 66.5 |
| Negative Control 2 | Photomer 3016 - 5<br>Photomer 4028 - 92<br>Irgacure 184 - 1.5<br>Irgacure 819 - 1.5 | $T_g$ = 59.0 |

Although Functional Comparative and Test Coating Compositions indicate that they contain 20 percent of the relevant additive, it should be apparent from Example 1 that these compositions are diluted 1:1 with Photomer 4028. Thus, the true concentration of the additive per se is half of that listed in Table 3 (while the concentration of Photomer 4028 is higher by the same amount).

Coating formulations were prepared in a jacketed beaker heated to 70° C. and were mixed using a high speed mixer. In each case, the components were weighed into the jacketed beaker using a balance and allowed to mix for about 1-2 hours, until the solid components were thoroughly dissolved and the mixture appeared homogenous.

where σ=the tensile strength at break of the sample, a=the crack length, and Y is a geometry factor:

$$[Y=1.77-0.177(2\lambda)+1.77(2\lambda)^2]$$

where λ=crack length/sample width. The a* values were calculated using the formula:

$$a^*=(1/\pi)(K_{1C}/\text{yield stress})^2.$$

The rod samples were used to generate tensile properties (Young's modulus, yield stress, tensile strength at break, and % elongation at break). The gauge length for this test was 5.1 cm and the test speed was 2.5 cm/minute. The fracture toughness, a*, and tensile property data is also reported in Table 4.

TABLE 4

Properties of Cured Polymeric Coating Materials

| Sample ($T_g$ = ° C.) | Young's Modulus (MPa) | Yield Stress (MPa) | Tensile Strength (MPa) | Percent Elongation | $K_{1C}$ (MPa·m$^{1/2}$) | a* (μm) |
|---|---|---|---|---|---|---|
| Functional Comparative 1a | 2364 ± 72 | 53.2 ± 1.1 | 53.2 ± 1.1 | 22.1 ± 9.2 | 1.43 ± 0.09 | 231 ± 30 |
| Functional Comparative 2 | 2285 ± 75 | 50.7 ± 1.1 | 50.7 ± 1.1 | 23.5 ± 6.9 | 1.38 ± 0.12 | 236 ± 41 |
| Functional Comparative 3 | 2231 ± 69 | 51.4 ± 2.1 | 51.73 ± 2.2 | 34.7 ± 4.8 | 1.40 ± 0.11 | 237 ± 42 |
| Test Coating A1 | 2331 ± 79 | 52.3 ± 1.6 | 52.6 ± 1.6 | 24.4 ± 10.3 | 1.38 ± 0.11 | 221 ± 37 |
| Plasticizer Comparative 1 | 1774 ± 56 | 37.2 ± 1.1 | 44.9 ± 2.0 | 39.4 ± 6.3 | 0.874 ± 0.072 | 175 ± 31 |
| Plasticizer Comparative 2 | 1897 ± 169 | 38.4 ± 3.2 | 40.1 ± 2.3 | 26.7 ± 8.0 | 0.946 ± 0.056 | 193 ± 40 |
| Plasticizer Comparative 3 | 1385 ± 50 | 28.4 ± 1.2 | 35.5 ± 4.0 | 28.0 ± 4.6 | 0.728 ± 0.054 | 209 ± 36 |
| Functional Comparative 4 | 2332 ± 53 | 55.2 ± 1.6 | 55.5 ± 1.6 | 32.1 ± 8.2 | 1.36 ± 0.07 | 192 ± 22 |
| Test Coating C | 2258 ± 34 | 53.7 ± 1.2 | 55.6 ± 3.0 | 38.3 ± 6.7 | 1.39 ± 0.07 | 215 ± 24 |
| Test Coating B | 2381 ± 71 | 55.0 ± 1.0 | 55.0 ± 1.0 | 22.6 ± 8.9 | 1.49 ± 0.09 | 230 ± 29 |
| Functional Comparative 1b | 2425 ± 78 | 56.1 ± 1.4 | 56.1 ± 1.4 | 22.3 ± 12.8 | 1.41 ± 0.06 | 201 ± 36 |
| Test Coating A2 | 2303 ± 50 | 54.1 ± 2.0 | 54.5 ± 2.7 | 33.3 ± 6.5 | 1.45 ± 0.06 | 227 ± 26 |
| Negative Control 1 | 2133 ± 42 | 48.2 ± 1.6 | 52.2 ± 5.1 | 33.0 ± 6.6 | 1.01 ± 0.09 | 119 ± 32 |
| Negative Control 2 | 2231 ± 26 | 51.6 ± 1.0 | 55.4 ± 5.7 | 34.3 ± 7.7 | 1.20 ± 0.09 | 172 ± 27 |

The curable compositions listed in Table 3 were used to prepare film samples for fracture toughness testing and rod samples for measurement of tensile properties. The film samples were prepared by casting the coatings on glass plates using a 10 mil draw down bar. The films were then cured using a Fusion D bulb at a dose of approximately 1.4 joules/cm². The rod samples were prepared by injecting the coating into Teflon tubing with an inner diameter of 25 mil. The samples were cured using a Fusion D bulb at a dose of approximately 2.6 joules/cm². After curing, the Teflon tubing was stripped from the samples. The resulting rods and films were allowed to condition overnight in a lab with a controlled humidity of 50% and temperature 23° C.

The samples were then tested using a Sintech MTS Tensile Tester. The film samples were used to measure the fracture toughness of the cured products using Linear Elastic Fracture Mechanics with a center cut notch geometry following the method described in ASTM E561, which is hereby incorporated by reference in its entirety. The sample width was 52 mm and three notch lengths (18 mm, 24 mm, and 30 mm) were tested. The gauge length for the test was 7.5 cm and the test speed was 2.5 cm/min. The fracture toughness value ($K_{1C}$) was calculated using the following equation:

$$K_{1C}=Y\sigma\sqrt{a}$$

A comparison of the formulations containing additives based on propoxylated pentaerythritol and having various levels of reactive hydroxyethyl acrylate end caps (Functional Comparatives 1a, 1b, 2, and 3 in Table 4) shows all of the materials to have similar mechanical and toughness properties. The level of reactive end group in the additive, which would bind the additive chemically to the developing polymer network during UV curing, had no significant effect on properties. Of particular significance are the formulations containing the completely non-reactive urethane/acrylate additives (Test Coatings A1, A2, and B in Table 4). In these examples, the nature of the non-reactive end group (octyl vs. propyl alcohol) also had no effect on properties. A similar effect was seen using urethane/acrylate additives based on a propoxylated glycerol (Test Coating C vs. Functional Comparative 4 in Table 4). Comparison to unmodified base control coatings (Negative Controls 1 and 2 in Table 4) shows that all of the additives (reactive and non-reactive) enhanced toughness while having little impact upon other mechanical properties. Also, the glass transition temperatures of all of these coatings were found to be essentially invariant.

In contrast, formulations prepared using the two non-reactive commercial tackifiers Sylvatac R40 and Sylvatac RE25 (Plasticizer Comparatives 1 and 2 in Table 4) or dioctyl phthalate (Plasticizer Comparative 3 in Table 4), showed a reduction in both mechanical and toughness properties compared to the unmodified base control coatings. These non-reactive additives, in contrast to those of the present invention, behaved, as expected, as plasticizers. This was also confirmed by their effective lowering of the cured coating glass transition temperature ($T_g$).

Example 3

Preparation of Optical Fibers with Primary Coatings

Optical fibers will be prepared using the above-identified primary coating materials and suitable secondary coating materials according to known procedures. Primary and secondary coating materials will be applied to drawn glass fibers subsequent to cooling. The glass fiber, having a diameter of about 125 μm, will be introduced into a container of one of the primary compositions listed in Example 1. As the coated fiber is removed from the container, the thickness of the primary coating composition will be adjusted to about 32.5 μm by passing the coated fiber through a die. The coated fiber will then be drawn through a second coating container holding a secondary coating composition of the present invention. As the coated fiber is removed from the second container, the thickness of the secondary coating composition will be adjusted to about 27.5 μm by passing the coated fiber through a die.

The coated fiber will be cured with actinic radiation, preferably UV light at a dose level of 0.25 to 1.0 J/cm² using a D (300 W) bulb (available from Fusion UV Systems, Inc. (Gaithersburg, Md.)), to produce an optical fiber having a diameter of about 245±10 μm. A person of ordinary skill in the art may also refer to the D-bulb as an irradiator lamp.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A curable composition comprising:
   an oligomer;
   at least one monomer; and
   an amount of a substantially non-reactive oligomeric additive that is effective to yield a cured product having a fracture toughness value that is higher than the fracture toughness value of a cured product of an otherwise identical composition lacking the non-reactive oligomeric additive, wherein the substantially non-reactive oligomeric additive has a structure or average structure according to formulae (I), (II), or (III)

$CAP_1$—RT'—OOC—NH—$R_1$—NH—COO—RT'—$CAP_1$     (I)

$R_M$—[OOC—NH—$R_A$—NH—COO—RT'—$CAP_1$]$_n$     (II)

$CAP_1$—RT'—OOC—NH—$R_1$—NH—[COO—$R_2$—OOC—NH—$R_1$—NH]$_w$—COO—RT'—$CAP_1$     (III)

wherein RT'—$CAP_1$ is the reaction product of a moiety (RT) having a reactive terminus and a capping moiety comprising a functional group that reacts with the reactive terminus, wherein RT'—$CAP_1$ has a non-reactive terminus,
   $R_1$ is a polyisocyanate core moiety substantially free of urethane bonds, $R_A$ is $R_1$ or —$R_1$—(NH—COO—$R_C$—OOC—NH—$R_1$)$_t$— where $R_C$ is a polyol-containing core moiety and t has an average value in the range of 0 to about 4,
   $R_M$ is a core moiety having an average functionality of n, where n is greater than 2.2,
   $R_2$ includes either at least one crystallizable polyol-derived moiety or at least one cyclic rigid moiety, and
   w is greater than zero.

2. The composition according to claim 1, wherein the curable composition is radiation curable.

3. The composition according to claim 1, wherein the substantially non-reactive oligomeric additive comprises up to about 20% of the composition.

4. The composition according to claim 1, wherein the substantially non-reactive oligomeric additive comprises up to about 10% of the composition.

5. The composition according to claim 1, wherein the cured product of the curable composition is characterized by a fracture toughness value of at least about 1.1 Mpa·m$^{1/2}$.

6. The composition according to claim 1, wherein the cured product of the curable composition is characterized by a defect sensitivity value (a*) greater than about 200 μm.

7. The composition according to claim 1, wherein the cured product of the curable composition is characterized by a fracture toughness value of at least about 1.1 Mpa·m$^{1/2}$ and a defect sensitivity value (a*) greater than about 200 μm.

8. The composition according to claim 1, wherein the cured product of the curable composition is characterized by a Young's modulus of at least about 1200 MPa.

9. The composition according to claim 1, wherein the cured product has a Young's modulus that is substantially the same as the Young's modulus of the cured product of an otherwise identical composition lacking the non-reactive oligomeric additive.

10. The composition according to claim 1, wherein the cured product has a glass transition temperature (Tg) that is substantially the same as the glass transition temperature (Tg) of the cured product of an otherwise identical composition lacking the non-reactive oligomeric additive.

11. A curable composition comprising:
    an oligomer;
    at least one monomer; and
    an amount of a substantially non-reactive oligomeric additive that is effective to yield a cured product having a fracture toughness value that is higher than the fracture toughness value of a cured product of an otherwise identical composition lacking the non-reactive oligomeric additive, wherein the substantially non-reactive oligomeric additive has a structure or average structure according to formulae (IV), (V), or (VI)

$CAP_2$—X—OCN—$R_1$—NCO—X—$CAP_2$     (IV)

$R_M$—[OOC—NH—$R_A$—NCO—X—$CAP_2$]$_n$     (V)

$CAP_2$—X—OCN—$R_1$—NH—[COO—$R_2$—OOC—NH—$R_1$—NH]$_w$—CO—X—$CAP_2$     (VI)

wherein
    $CAP_2$—X— is a capping moiety having a non-reactive terminus,
    X is S, O, or N,
    $R_1$ is a polyisocyanate core moiety substantially free of urethane bonds,
    $R_A$ is $R_1$ or —$R_1$—(NH—COO—$R_C$—OOC—NH—$R_1$)$_t$— where $R_C$ is a polyol-derived core moiety and t has an average value in the range of 0 to about 4, $R_M$ is a core moiety having an average functionality of n, where n is greater than 2.2.

$R_2$ includes either at least one crystallizable polyol-containing moiety or at least one cyclic rigid moiety, and w is greater than zero.

12. The composition according to claim 11, wherein the substantially non-reactive oligomeric additive comprises up to about 10% of the composition.

13. The composition according to claim 11, wherein the cured product of the curable composition is characterized by a fracture toughness value of at least about 1.1 MPa·m$^{1/2}$.

14. The composition according to claim 11, wherein the cured product of the curable composition is characterized by a defect sensitivity value (a*) greater than about 200 μm.

15. The composition according to claim 11, wherein the cured product of the curable composition is characterized by a Young's modulus of at least about 1200 MPa.

16. The composition according to claim 11, wherein the cured product has a Young's modulus that is substantially the same as the Young's modulus of the cured product of an otherwise identical composition lacking the non-reactive oligomeric additive.

* * * * *